US012574768B2

(12) United States Patent
Lin et al.

(10) Patent No.: US 12,574,768 B2
(45) Date of Patent: Mar. 10, 2026

(54) METHOD AND APPARATUS FOR PHYSICAL DOWNLINK CONTROL CHANNEL MONITORING PER MULTIPLE SLOTS

(71) Applicant: Samsung Electronics Co., Ltd., Suwon-si (KR)

(72) Inventors: Qiongjie Lin, Sunnyvale, CA (US); Aristides Papasakellariou, Houston, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 17/649,785

(22) Filed: Feb. 2, 2022

(65) Prior Publication Data

US 2022/0295319 A1 Sep. 15, 2022

Related U.S. Application Data

(60) Provisional application No. 63/298,027, filed on Jan. 10, 2022, provisional application No. 63/229,665, (Continued)

(51) Int. Cl.
$H04W\ 24/08$ (2009.01)
$H04L\ 1/1607$ (2023.01)
(Continued)

(52) U.S. Cl.
CPC ........... *H04W 24/08* (2013.01); *H04L 1/1642* (2013.01); *H04L 27/26025* (2021.01); *H04W 72/0446* (2013.01); *H04W 72/23* (2023.01)

(58) Field of Classification Search
CPC . H04W 24/08; H04W 72/0446; H04W 72/23; H04L 1/1642; H04L 27/26025; H04L 5/001; H04L 5/0053
See application file for complete search history.

(56) References Cited

U.S. PATENT DOCUMENTS

2020/0329389 A1    10/2020  Hosseini et al.
2020/0351681 A1    11/2020  Salah et al.
(Continued)

FOREIGN PATENT DOCUMENTS

WO        2020072963 A1    4/2020

OTHER PUBLICATIONS

"3rd Generation Partnership Project; Technical Specification Group Radio Access Network; NR; Physical channels and modulation (Release 16)", 3GPP TS 38.211 v16.4.0, Dec. 2020, 133 pgs.
(Continued)

*Primary Examiner* — Sharmin Chowdhury

(57) ABSTRACT

Methods and apparatuses for physical downlink control channel (PDCCH) monitoring per multiple slots. A method for operating a user equipment includes determining a combination (X, Y) of consecutive slots, where X and Y are positive integers with Y<X, and receiving first physical PDCCHs with a first subcarrier spacing (SCS) configuration $\mu_1$ within Y slots of X slots. The X slots start from a slot with a number $n_{start}$, on a first cell. Here, $(n_f \cdot N_{slot}^{frame,\mu_1} + n_{start})$ mod X=0, where $n_f$ is a frame number and $N_{slot}^{frame,\mu_1}$ is number of slots per frame for the first SCS configuration $\mu_1$.

17 Claims, 6 Drawing Sheets

Related U.S. Application Data filed on Aug. 5, 2021, provisional application No. 63/149,162, filed on Feb. 12, 2021.

(51) Int. Cl.
| | | |
|---|---|---|
| *H04L 27/26* | (2006.01) | |
| *H04W 72/0446* | (2023.01) | |
| *H04W 72/23* | (2023.01) | |

(56) References Cited

U.S. PATENT DOCUMENTS

| | | | | |
|---|---|---|---|---|
| 2022/0232401 A1* | 7/2022 | Nam | .................... | H04L 5/0053 |
| 2022/0240244 A1* | 7/2022 | Hugl | .................... | H04L 5/0078 |
| 2023/0024010 A1* | 1/2023 | Ma | ........................ | H04L 5/0053 |
| 2023/0141339 A1* | 5/2023 | Kittichokechai | ..... | H04W 24/08 |
| | | | | 370/329 |
| 2023/0292316 A1* | 9/2023 | Cheng | .............. | H04W 72/1273 |
| 2023/0354369 A1* | 11/2023 | Li | ............................ | H04L 5/14 |
| 2024/0056272 A1* | 2/2024 | Okano | ................. | H04W 72/04 |

OTHER PUBLICATIONS

"3rd Generation Partnership Project; Technical Specification Group Radio Access Network; NR; Multiplexing and channel coding (Release 16)", 3GPP TS 38.212 v16.4.0, Dec. 2020, 152 pgs.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 v16.4.0, Dec. 2020, 169 pgs.

"5G; NR; Radio Resource Control (RRC); Protocol specification (3GPP TS 38.331 version 16.2.0 Release 16)", ETSI TS 138 331 V16.2.0, Nov. 2020, 908 pages.

"5G; NR; Medium Access Control (MAC) protocol specification (3GPP TS 38.321 version 16.1.0 Release 16)", ETSI TS 138 321 V16.1.0, Jul. 2020, 153 pages.

International Search Report and Written Opinion issued May 26, 2022 regarding Application No. PCT/KR2022/002061, 6 pages.

Apple Inc., "PDCCH monitoring enhancements for NR between 52.6GHz and 71 GHz", 3GPP TSG RAN WG1 #104-e, R1-2101373, Jan. 2021, 6 pages.

Nokia et al., "PDCCH monitoring enhancements", 3GPP TSG RAN WG1 #104-e, R1-2100258, Jan. 2021, 5 pages.

Extended European Search Report issued Oct. 24, 2024 regarding Application No. 22753014.4, 7 pages.

Qualcomm Incorporated, "PDCCH monitoring enhancements", 3GPP TSG-RAN WG1 #104-e, R1-2101454, Jan. 2021, 4 pages.

* cited by examiner

600

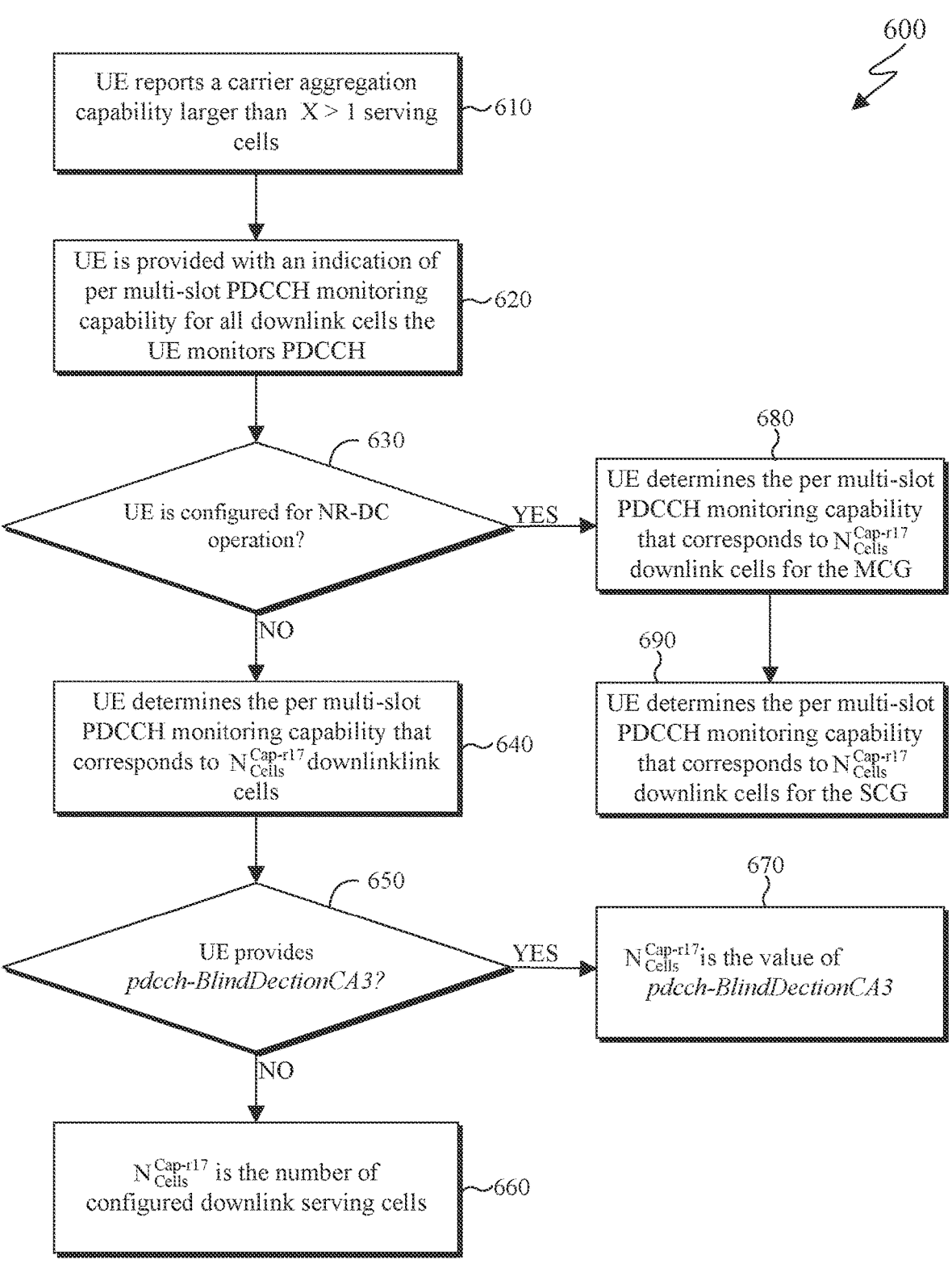

UE reports a carrier aggregation capability larger than  X > 1 serving cells ~610

UE is provided with an indication of per multi-slot PDCCH monitoring capability for all downlink cells the UE monitors PDCCH ~620

630 — UE is configured for NR-DC operation?

680 — UE determines the per multi-slot PDCCH monitoring capability that corresponds to $N_{Cells}^{Cap-r17}$ downlink cells for the MCG

YES

NO

UE determines the per multi-slot PDCCH monitoring capability that corresponds to $N_{Cells}^{Cap-r17}$ downlinklink cells ~640

690 — UE determines the per multi-slot PDCCH monitoring capability that corresponds to $N_{Cells}^{Cap-r17}$ downlink cells for the SCG 650 — UE provides *pdcch-BlindDectionCA3*?

YES

670 — $N_{Cells}^{Cap-r17}$ is the value of *pdcch-BlindDectionCA3*

NO $N_{Cells}^{Cap-r17}$ is the number of configured downlink serving cells ~660

FIG. 6

METHOD AND APPARATUS FOR PHYSICAL DOWNLINK CONTROL CHANNEL MONITORING PER MULTIPLE SLOTS

CROSS-REFERENCE TO RELATED APPLICATION AND CLAIM OF PRIORITY

This application claims priority under 35 U.S.C. § 119(e) to U.S. Provisional Patent Application No. 63/149,162 filed on Feb. 12, 2021, U.S. Provisional Patent Application No. 63/229,665 filed on Aug. 5, 2021, and U.S. Provisional Patent Application No. 63/298,027 filed on Jan. 10, 2022. The above-identified provisional patent applications are hereby incorporated by reference in their entirety.

TECHNICAL FIELD

The present disclosure relates generally to wireless communication systems and, more specifically, the present disclosure relates to methods and apparatuses for physical downlink control channel (PDCCH) monitoring per multiple slots.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to method and apparatus for physical downlink control channel monitoring per multiple slots.

In one embodiment, a user equipment (UE) is provided. The UE includes a processor configured to determine a combination (X, Y) of consecutive slots. X and Y are positive integers with Y<X. The UE further includes a transceiver operably coupled to the processor. The transceiver is configured to receive first PDCCHs with a first subcarrier spacing (SCS) configuration $\mu_1$ within Y slots of X slots. The X slots start from a slot with a number $n_{start}$ on a first cell. Here, $(n_f N_{slot}^{frame,\mu_1} + n_{start}) \bmod X = 0$, where $n_f$ is a frame number and $N_{slot}^{frame,\mu_1}$ is a number of slots per frame for the first SCS configuration $\mu_1$.

In another embodiment, a base station (BS) is provided. The BS includes a processor configured to determine a combination (X, Y) of consecutive slots. X and Y are positive integers with Y<X. The BS further includes a transceiver operably coupled to the processor. The transceiver is configured to transmit first PDCCHs with a first SCS configuration $\mu_1$ within Y slots of X slots. The X slots starts from slot with number $n_{start}$ on a first cell. Here, $(n_f N_{slot}^{frame,\mu_1} + n_{start}) \bmod X = 0$, where $n_f$ is a frame number and $N_{slot}^{frame,\mu_1}$ is number of slots per frame for the first SCS configuration $\mu_1$.

In yet another embodiment, a method is provided. The method includes determining a combination (X, Y) of consecutive slots, where X and Y are positive integers with Y<X, and receiving first PDCCHs with a first SCS configuration $\mu_1$ within Y slots of X slots. The X slots start from a slot with a number $n_{start}$ on a first cell. Here, $(n_f N_{slot}^{frame,\mu_1} + n_{start}) \bmod X = 0$, where $n_f$ is a frame number and $N_{slot}^{frame,\mu_1}$ is number of slots per frame for the first SCS configuration $\mu_1$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example method of a UE procedure for determining per multi-slots PDCCH monitoring for carrier aggregation (CA) according to embodiments of present disclosure.

DETAILED DESCRIPTION

Figure 1:
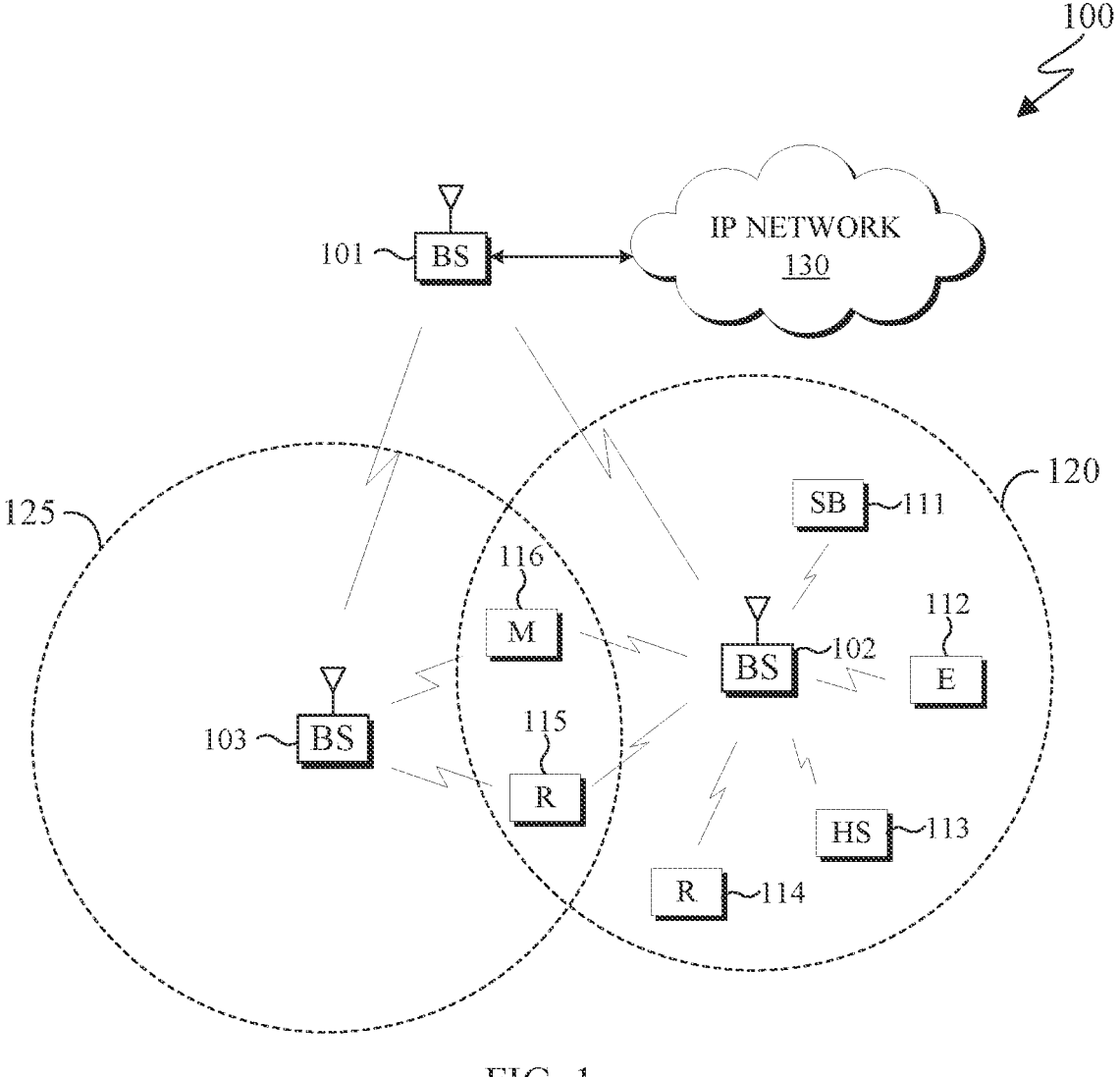
FIG. 1 illustrates an example wireless network according to embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: [1] 3GPP TS 38.211 v16.4.0, "NR; Physical channels and modulation;" [2] 3GPP TS 38.212 v16.4.0, "NR; Multiplexing and channel coding;" [3] 3GPP TS 38.213 v16.4.0, "NR; Physical layer procedures for control;" [4] 3GPP TS 38.214 v16.4.0, "NR; Physical layer procedures for data;" [5] 3GPP TS 38.331 v16.2.0, "NR; Radio Resource Control (RRC) protocol specification;" and [6] 3GPP TS 38.321 v16.1.0, "NR; Medium Access Control (MAC).protocol specification."

To meet the demand for wireless data traffic having increased since deployment of the fourth generation (4G) communication systems and to enable various vertical applications, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
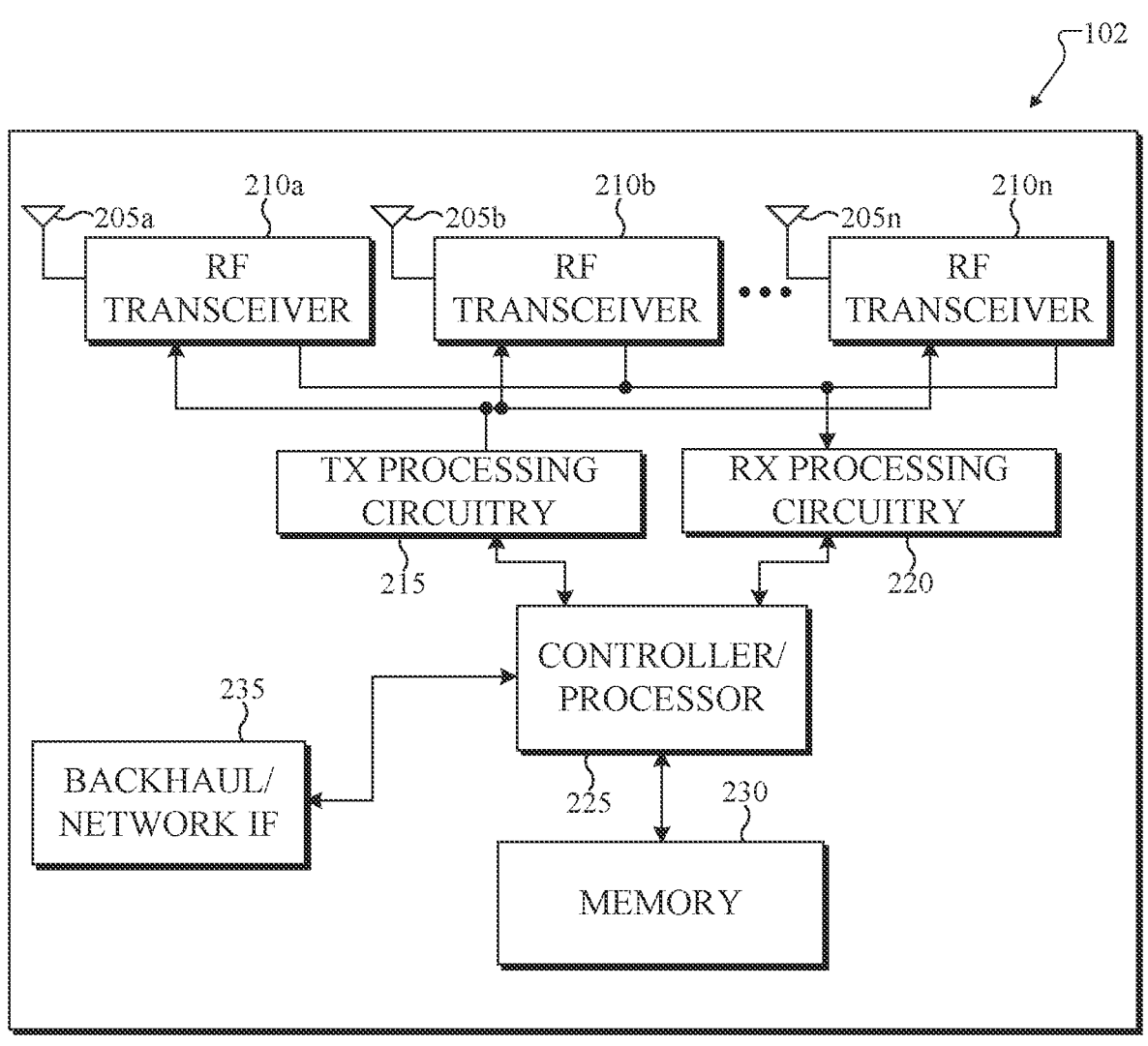
FIG. 2 illustrates an example BS according to embodiments of the present disclosure.
Figure 3:
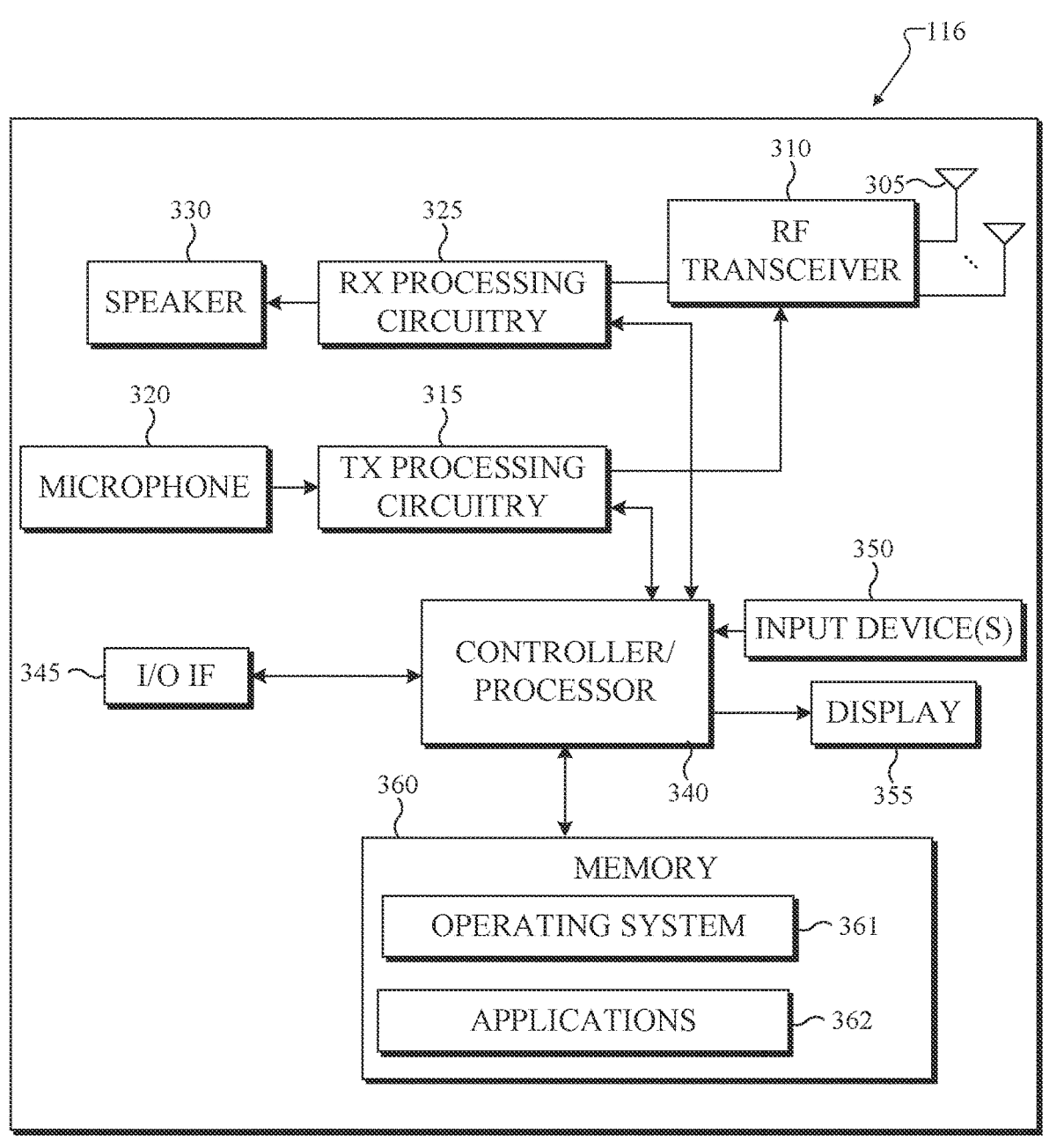
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for physical downlink control channel monitoring per multiple slots. In certain embodiments, and one or more of the BSs 101-103 includes circuitry, programing, or a combination thereof for physical downlink control channel monitoring per multiple slots.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support physical downlink control channel monitoring per multiple slots. The controller/processor 225 could also support a blind interference sensing (BIS) process, such as performed by a BIS algorithm, and decodes the received signal subtracted by the interfering signals. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). In certain embodiments, the controller/processor 225 support physical downlink control channel monitoring per multiple slots. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
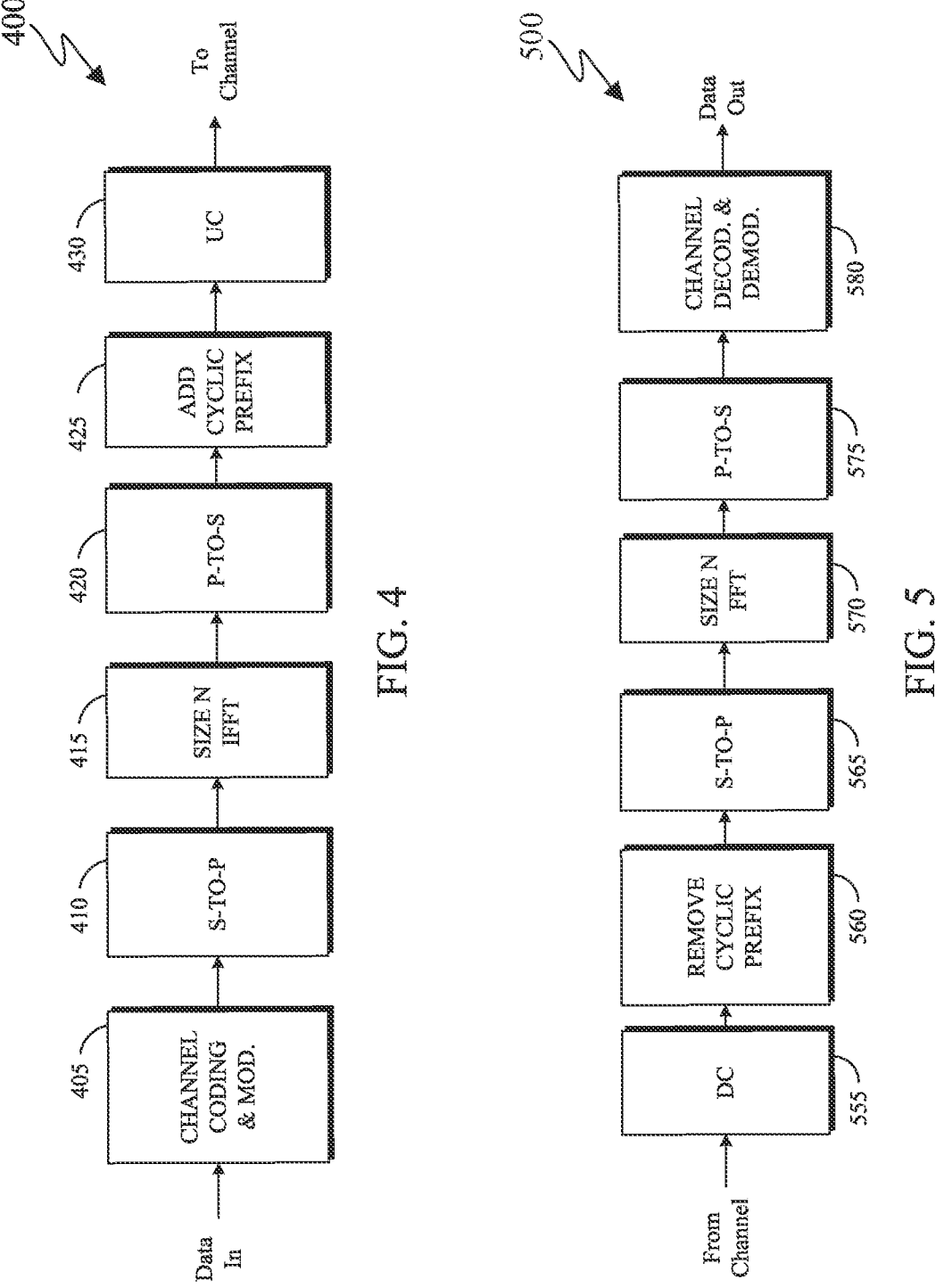
FIGS. 4 and 5 illustrate example wireless transmit and receive paths according to embodiments of present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support physical downlink control channel monitoring per multiple slots as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

As described in more detail below, the transmit and receive paths of the gNB 102 (implemented using the RF transceivers 210a-210n of FIG. 2, TX processing circuitry 215 of FIG. 2, and/or RX processing circuitry 220 of FIG. 2) support communication with aggregation of frequency division duplexing (FDD) cells and time division duplexing (TDD) cells.

NR supports transmission and reception based on higher layer configurations, such as radio resource control (RRC) signaling, as described in REF 4 and REF 6.

Semi-Persistent Scheduling (SPS) of physical downlink shared channel (PDSCH) receptions is configured by RRC per serving cell and per bandwidth part (BWP). Multiple assignments can be active simultaneously in the same BWP. Activation and deactivation of SPS PDSCH receptions are independent among the serving cells.

For a SPS PDSCH reception, a downlink (DL) assignment is provided to a UE by a physical downlink control channel (PDCCH) and the UE stores or clears the DL assignment based on whether the DL assignment indicates SPS PDSCH activation or deactivation, respectively.

In certain embodiments, RRC configures the following parameters when the SPS PDSCH is configured: (i) configured scheduling radio network temporary identifier (cs-RNTI), (ii) nrofHARQ-Processes, (iii) harq-ProcID-Offset, and (iv) periodicity. Here, cs-RNTI is for activation, deactivation, and retransmission. The expression nrofHARQ-Processes represents the number of configured HARQ processes for SPS PDSCH. The expression harq-ProcID-Offset corresponds to the offset of HARQ process for SPS PDSCH. Finally, periodicity is the periodicity of configured downlink assignment for SPS PDSCH.

When a SPS PDSCH is released by upper layers, the UE releases all the corresponding configurations.

After a downlink assignment is configured for SPS PDSCH, the Medium Access Control (MAC) entity considers sequentially that the Nth downlink assignment occurs in the slot as described in Equation (1).

$$
\begin{aligned}
(\text{numberOfSlotsPerFrame} \times \mathit{SFN} + \text{slot number in the} \\
\text{frame}) = [(\text{numberOfSlotsPerFrame} \times \text{SFNstart} \\
\text{time} + \text{slotstart time}) + N \times \text{periodicity} \times \text{num-} \\
\text{berOfSlotsPerFrame}/10] \text{ modulo } (1024 \times \text{num-} \\
\text{berOfSlotsPerFrame})
\end{aligned}
\tag{1}
$$

Here, the expressions SFNstart time and slotstart time are the SFN and slot, respectively, of the first transmission of PDSCH where the configured downlink assignment was (re-)initialized.

There are three types of a physical uplink shared channel (PUSCH) transmission without dynamic grant. The configured grant Type 1 is where an uplink grant is provided by RRC, and stored as configured uplink grant. The configured grant Type 2 is where an uplink grant is provided by PDCCH, and stored or cleared as configured uplink grant based on L1 signalling indicating configured uplink grant activation or deactivation. Finally, retransmissions on a stored configured uplink grant of Type 1 or Type 2 are configured with cg-RetransmissionTimer.

It is noted that Type 1 and Type 2 are configured by RRC per serving cell and per BWP. Multiple configurations can be active simultaneously in the same BWP. For Type 2, activation and deactivation are independent among the serving cells. For the same BWP, the MAC entity can be configured with both Type 1 and Type 2.

In certain embodiments, RRC configures the following five parameters when the configured grant Type 2 is configured. The first parameter, CS-RNTI is for activation, deactivation, and retransmission. The second parameter, periodicity is the periodicity of the configured grant Type 2. The third parameter nrofHARQ-Processes corresponds to the number of HARQ processes for configured grant. The fourth parameter harq-ProcID-Offset corresponds to the offset of HARQ process for configured grant for operation with shared spectrum channel access. Finally the fifth parameter harq-ProcID-Offset2, corresponds offset of HARQ process for configured grant.

Additionally RRC configures the following parameter, cg-RetransmissionTimer, when retransmissions on configured uplink grant is configured. Here, cg-Retransmission-Timer corresponds to the duration after a configured grant (re)transmission of a HARQ process when the UE shall not autonomously retransmit that HARQ process.

After an uplink grant is configured for a configured grant Type 2, the MAC entity considers sequentially that the $N^{th}$ uplink grant occurs in the symbol as described in Equation (2).

$$[(SFN \times \text{numberOfSlotsPerFrame} \times \text{numberOfSymbol-sPerSlot}) + (\text{slot number in the frame} \times \text{num-berOfSymbolsPerSlot}) + \text{symbol number in the slot}] = [(SFN_{start\ time} \times \text{numberOfSlotsPerFrame} \times \text{numberOfSymbolsPerSlot} + \text{slot}_{start\ time} \times \text{num-berOfSymbolsPerSlot} + \text{symbol}_{start\ time}) + N \times \text{peri-odicity}] \text{ modulo } (1024 \times \text{numberOfSlotsPerFrame} \times \text{numberOfSymbolsPerSlot}) \quad (2)$$

Here, $SFN_{start\ time}$, $slot_{start\ time}$, and $symbol_{start\ time}$ are the SFN, slot, and symbol, respectively, of the first transmission opportunity of PUSCH where the configured uplink grant was (re-) initialised.

In certain embodiments, when the configured uplink grant is released by upper layers, all the corresponding configurations are released and all corresponding uplink grants shall be cleared.

For a configured grant Type 2, the MAC entity shall clear the configured uplink grant(s) immediately after first transmission of Configured Grant Confirmation MAC control element (CE) or Multiple Entry Configured Grant Confirmation MAC CE which confirms the configured uplink grant deactivation.

In certain embodiments, retransmissions are done by: (i) repetition of configured uplink grants, (ii) receiving uplink grants addressed to CS-RNTI, or (iii) retransmission on configured uplink grants.

It is noted NR release 15 supports slot-based PDCCH monitoring with maximum number a of PDCCH blind decodes (BD) and non-overlapping control channel element (CCE) for channel estimation defined per slot for subcarrier spacing (SCS) of 15 kHz, 30 kHz, 60 kHz, and 120 kHz. The corresponding maximum number of PDCCH BD and non-overlapping CCE per slot are respectively defined in Table 10.1-2 and Table 10.1-3 of TS 38.213 [see, REF-3].

Moreover, NR release 16 additionally supports span-based PDCCH monitoring where the maximum numbers of PDCCH BDs and CCE limits are defined in Table 10.1-2A and Table 10.1-3A of TS 38.213 [REF-3] for different UE capabilities. Three types of PDCCH monitoring capabilities with combination (X, Y) are supported. The span gap, X, can be 2 or 4 or 7 symbols, while the span duration, Y, is 2 or 3 symbols for SCS configuration $\mu=0,1$, where the SCS is $2^{\mu} \cdot 15$ kHz.

NR operation on a carrier with a frequency between 52.6 GHz and 71 GHz uses an SCS of 120 kHz or larger to overcome phase noise and use the same FFT size as for operation with a lower carrier frequency. Therefore, new maximum numbers for PDCCH BD and non-overlapping CCEs for higher SCS, such as 480 kHz and 960 kHz need to be defined. The transmission time interval (TTI) in terms of a span duration or a slot duration decreases linearly as the SCS increases. For a same UE PDCCH monitoring capability as for slot-based or span-based PDCCH monitoring with a maximum SCS of 120 kHz, the PDCCH monitoring overhead within a TTI would materially increase due to the short TTI duration for a high SCS. The larger PDCCH monitoring burden within a shorter TTI can also be challenging for a UE to implement in practice. For example, a UE is not typically able to process a same maximum number of PDCCH BDs/non-overlapping CCEs per slot for SCS of 480 kHz as for SCS of 30 kHz, due to the shorter slot duration for SCS of 480 kHz.

Multi-slot span based PDCCH monitoring can be considered to reduce the large PDCCH monitoring burden within a short TTI at high SCS by increasing a TTI of a slot to a TTI of more than one slots. A PDCCH monitoring capability in terms of maximum numbers of PDCCH BD/non-overlapping CCE at high SCS can be determined for a PDCCH monitoring period of multiple consecutive slots.

When a UE (such as the UE 116) is configured for operation with carrier aggregation (CA), including in case of dual connectivity (DC), the UE should monitor PDCCH for scheduling on multiple cells and a UE capability for maximum numbers of PDCCH BD/non-overlapping CCEs may not scale linearly with a number of scheduled cells relative to the maximum numbers of PDCCH BD/non-overlapping CCEs for a single scheduled cell. For operation with a small slot duration per scheduling cell, such as for SCS of 480 kHz or 960 kHz, the maximum numbers of PDCCH BDs/non-overlapping CCEs should be defined per multiple slots while they should be defined per span smaller than a slot, or per slot, for smaller SCS such as 15 kHz or 30 kHz.

The determination of CCE indexes for a PDCCH candidate is based on a parameter, $Y_{p,n_{s,f}^{\mu}}$. Here, the parameter, $n_{s,f}^{\mu}$, is the slot index of the PDCCH monitoring occasion. For multi-slot based PDCCH monitoring and a PDCCH monitoring duration of X>1 slots, the index of the first slot from the X slots is used to determine $Y_{p,n_{s,f}^{\mu}}$ (for example, $Y_{p,n_{s,f}^{\mu}}$ is replaced by $Y_{p,n_{s,f}^{\mu}-X}$), for each PDCCH monitoring occasion within the X slots. otherwise, with $Y_{p,n_{s,f}^{\mu}}$ updated per slot and considering the time-first mapping for PDCCH and that Y can be more than 1 slot, the Rel-16 CCE-based structure for PDCCH transmissions cannot be maintained.

Therefore, embodiments of the present disclosure take into consideration that there is a need to support a determination per multiple slots for a PDCCH monitoring capability of a UE configured for operation with carrier aggregation. Embodiments of the present disclosure also take into consideration that there is a need to support allocation of search space sets, or of PDCCH candidates per search space set, including dropping of search space sets or of PDCCH candidates per search space set, for a PDCCH monitoring period of N>1 consecutive slots. Embodiments of the present disclosure further take into consideration that there is a need to support reporting of a UE capability for PDCCH monitoring over multiple slots. Additionally, embodiments of the present disclosure take into consideration that there is a need to support determining of CCE indexes of a PDCCH candidate for PDCCH monitoring over multiple slots.

It is noted that this disclosure includes several embodiments that can be used in conjunction or in combination with one another, or can operate as standalone. For example embodiments of the present disclosure describe (i) per multi-slot PDCCH monitoring capability for carrier aggregation, (ii) PDCCH dropping/overbooking per multi-slots, (iii) multi-slot PDCCH monitoring capability report, and (iv) CCE location determination.

Embodiments of the present disclosure describe multi-slot monitoring capabilities for CA. The following examples and embodiments, such as those of FIG. 6 describe per multi-slot monitoring capabilities for carrier aggregation.

For example, embodiments of this disclosure considers a PDCCH monitoring capability per group of $N_{slot} > 1$ slots for a UE (such as the UE 116) configured for operation CA and with SCS configuration, $\mu$. Here, $\mu_{min} \leq \mu \leq \mu_{max}$, $\mu_{min}$ or $\mu_{max}$ is a positive integer such as $\mu_{min} = 5$, $\mu_{max} = 6$.

In one example of multi-slot PDCCH monitoring capability, a UE (such as the UE 116) can monitor per group of $N_{slot} = X$ slots according to combination of (X, Y). The PDCCH monitoring capability is according to a combination of (X, Y), where X and Y are numbers of consecutive slots, groups of X slots are consecutive and non-overlapping, and the Y slots are within the X slots. The first group of X slots starts from the beginning of a subframe. The start of two consecutive groups of Y slots is separated by X slots. The UE determines a span configured with a number of PDCCH candidates according to the combination of (X, Y).

The UE PDCCH monitoring capability per multiple slots can be determined based on one of the following methods. In a first method, the PDCCH monitoring capability per group of $N_{slot}$ is reported by the UE. In another method, the PDCCH monitoring capability per group of $N_{slot}$ is provided to the UE by higher layers, such as by a configuration parameter monitoringCapabilityConfig, for a scheduling cell (a cell where the UE monitors PDCCH). In yet another method, the PDCCH monitoring capability per group of $N_{slot}$ is defined in the specifications of the system operation for each applicable SCS configuration of PDCCH transmissions. For example, a UE can assume a PDCCH monitoring capability per multiple slots for PDCCH receptions in an active DL BWP of a scheduling cell when a SCS configuration is $\mu = 5$ or $\mu = 6$.

The UE can report pdcch-BlindDetectionCA3 to indicate PDCCH blind decoding capability PDCCH monitoring capability per multi-slots supported by the UE. The UE can report pdcch-BlindDetectionCA to indicate PDCCH blind decoding capability PDCCH monitoring capability supported by the UE.

If a UE (such as the UE 116) indicates a carrier aggregation capability larger than K serving cells with configuration for PDCCH monitoring capability per multiple slots (for example, monitoringCapabilityConfig=r17monitoringcapability), the UE includes in higher layer parameter, for example, UE-NR-Capability-r17, an indication for a maximum number of PDCCH candidates and for a maximum number of non-overlapped CCEs the UE can monitor, for downlink cells with monitoringCapabilityConfig=r17monitoringcapability when the UE is configured for carrier aggregation operation over more than X cells. X is predetermined integer, for example, K=4 or K=2. Alternatively, there may not be a predefined value of X and the UE can report a PDCCH monitoring capability for any number of serving cells. The number of slots $N_{slot}$ or a combination (X, Y) can also be predetermined for each SCS with PDCCH monitoring capability defined per number of slots, such as $N_{slot} = 4$ slots for SCS of 480 kHz or $N_{slot} = 8$ slots for SCS of 960 kHz.

When a UE is not configured for DC operation and the UE is configured for PDCCH monitoring per group of $N_{slot}$ slots for all downlink cells, for example UE is provided with monitoringCapabilityConfig=r17monitoringcapability for all downlink cells, where the UE monitors PDCCH, the UE determines a capability to monitor a maximum number of PDCCH candidates and a maximum number of non-overlapped CCEs per number of slots that corresponds to $N_{cells}^{cap-r17}$ downlink cells. For example, $N_{cells}^{cap-r17}$ is the number of configured downlink serving cells if the UE does not provide pdcch-BlindDetectionCA, otherwise $N_{cells}^{cap-r17}$ is the value of pdcch-BlindDetectionCA.

When a UE (such as the UE 116) is configured for DC operation where both the master cell group (MCG) and the secondary cell group (SCG) use NR radio access technology (NR-DC), the UE determines a capability to monitor a maximum number of PDCCH candidates and a maximum number of non-overlapped CCEs per multi-slots that corresponds to $N_{cells}^{cap-r17} = N_{cells}^{MCG}$ downlink cells for the MCG where $N_{cells}^{MCG}$ is provided by a higher layer configuration parameter, e.g. pdcch-BlindDetection3, for the MCG and determines a capability to monitor a maximum number of PDCCH candidates and a maximum number of non-overlapped CCEs per $N_{slot}$ slots that corresponds to $N_{cells}^{cap-r17} = N_{cells}^{SCG}$ downlink cells for the SCG where $N_{cells}^{SCG}$ is provided by a higher layer configuration parameter, e.g. pdcch-BlindDetection3, for the SCG. When the UE is configured for carrier aggregation operation over more than X cells, or for a cell group when the UE is configured for NR-DC operation, the UE does not expect to monitor per group of $N_{slot}$ slots a number of PDCCH candidates or a number of non-overlapped CCEs that is larger than the maximum number as derived from the corresponding value of $N_{cells}^{cap-r17}$.

FIG. 6 illustrates an example method 600 of a UE procedure for determining per multi-slots PDCCH monitoring for CA according to embodiments of present disclosure. The steps of the method 600 can be performed by any of the UEs 111-116 of FIG. 1, such as the UE 116 of FIG. 3. The method 600 of FIG. 6 is for illustration only and other embodiments can be used without departing from the scope of the present disclosure.

In step 610, a UE (such as the UE 116) reports a CA capability larger than X>1 serving cells. In step 620 the UE is configured with multiple downlink serving cells, and is provided with an indication for PDCCH monitoring over $N_{slot} > 1$ slots for all downlink cells where the UE monitors PDCCH. In step 630, the UE determines whether the UE is configured with NR-DC operation.

When the UE is not configured with NR-DC operation (as determined in step 630), the UE in step 640 determines a capability to monitor a maximum number of PDCCH candidates and a maximum number of non-overlapped CCEs per $N_{slot}$ slots that corresponds to $N_{cells}^{cap-r17}$ downlink cells. Then in step 650, UE determines whether the UE reports pdcch-BlindDetectionCA3 to indicate PDCCH decoding capability. If the UE does not provide pdcch-BlindDetectionCA3, the UE, in step 660 determines $N_{cells}^{cap-r17}$ as the number of configured downlink serving cells, 506. Alternatively, if the UE does provide pdcch-BlindDetectionCA3, the UE, in step 670 determines $N_{cells}^{cap-r17}$ as the value of pdcch-BlindDetectionCA3.

When the UE is configured with NR-DC operation (as determined in step 630), the UE in step 680 the UE determines a capability to monitor a maximum number of PDCCH candidates and a maximum number of non-overlapped CCEs per $N_{slot}$ slots that corresponds to $N_{cells}^{cap-r17} = N_{cells}^{MCG}$ downlink cells for MCG. In step 690, the UE determines a capability to monitor a maximum number of PDCCH candidates and a maximum number of non-overlapped CCEs per $N_{slot}$ slots that corresponds to $N_{cells}^{cap-r17}=N_{cells}^{SCG}$ downlink cells for SCG.

When a UE is configured for NR-DC operation with a total of $N_{NR-DC}^{DL,cells}$ downlink cells on both the MCG and the SCG and the UE is provided monitoringCapabilityConfig=r17monitoringcapability for all downlink cells (where the UE monitors PDCCH), the UE expects to be provided pdcch-BlindDetection for the MCG and pdcch-BlindDetection for the SCG with values that satisfy either (i) pdcch-BlindDetection3 for the MCG+ pdcch-BlindDetection3 for the SCG<=pdcch-BlindDetectionCA, if the UE reports pdcch-BlindDetectionCA or (ii) pdcch-BlindDetection3 for the MCG+pdcch-BlindDetection3 for the SCG<=$N_{NR-DC}^{DL,cells}$, if the UE does not report pdcch-BlindDetectionCA.

When a UE is configured for NR-DC operation and the UE is provided monitoringCapabilityConfig=r17monitoringcapability for all downlink cells where the UE monitors PDCCH, the UE may indicate, through pdcch-BlindDetectionMCG-UE-r17 and pdcch-BlindDetectionSCG-UE-r17, respective maximum values for pdcch-BlindDetection for the MCG and pdcch-BlindDetection for the SCG.

In certain embodiments, if the UE reports pdcch-BlindDetectionCA then (i) the value range of pdcch-BlindDetectionMCG-UE-r17 or of pdcch-BlindDetectionSCG-UE-r17 is [1, . . . , pdcch-BlindDetectionCA-1] and (ii) pdcch-BlindDetectionMCG-UE-r17+pdcch-BlindDetectionSCG-UE-r17>=pdcch-BlindDetectionCA. Otherwise, if $N_{NR-DC,max,r17}^{DL,cells}$ is a maximum total number of downlink cells that the UE can be configured on both the MCG and the SCG for NR-DC as indicated in UE-NR-Capability, then (i) the value range of pdcch-BlindDetectionMCG-UE-r17 or of pdcch-BlindDetectionSCG-UE-r17 is [1, 2, 3] or 1 and (ii) pdcch-BlindDetectionMCG-UE-r17+pdcch-BlindDetectionSCG-UE-r17>=$N_{NR-DC,max,r17}^{DL,cells}$.

If a UE can support a first set of $N_{cells,0}^{DL}$ and a second set of $N_{cells,1}^{DL}$, then the UE determines a number of serving cells as $N_{cells,0}^{DL}+R \cdot N_{cells,1}^{DL}$ where R is a value reported by the UE. Here, the first set of $N_{cells,0}^{DL}$ serving cells is where the UE is either not provided coresetPoolIndex or is provided coresetPoolIndex with a single value for all CORESETs on all DL BWPs of each scheduling cell from the first set of serving cells. Additionally, the second set of $N_{cells,1}^{DL}$ serving cells is where the UE is either not provided coresetPoolIndex or is provided coresetPoolIndex with a value 0 for a first CORESET, and with a value 1 for a second CORESET on any DL BWP of each scheduling cell from the second set of serving cells.

In certain embodiments, a UE can support both PDCCH monitoring capability per multiple slots and PDCCH monitoring capability per slot. For example, in one method, the configuration of PDCCH monitoring capability per multiple slots and PDCCH monitoring capability per slot is bundled in a single higher layer configuration parameter, e.g. r17PDCCHmonitoring, For a groups of cells, the UE is configured for PDCCH monitoring capability per slot for cells with SCS<=N_SCS kHz and for PDCCH monitoring capability per multiple slots with SCS>N_SCS kHz. N_SCS is predetermined constant, for example N_SCS=120. In another method, the configuration of PDCCH monitoring capability per multiple slots and PDCCH monitoring capability per slot is not bundled. The UE is configured for PDCCH monitoring capability per slot for a first group of cells, and the UE is configured for PDCCH monitoring capability per multiple slots for a second group of cells.

When the UE supports both (i) PDCCH monitoring capability per multiple slots and (ii) PDCCH monitoring capability per slot, then the UE can report pdcch-BlindDetectionCA_1 and pdcch-BlindDetectionCA_3 to indicate PDCCH blind decoding capability based on PDCCH monitoring capability per slot, and PDCCH monitoring capability per multiple slots, respectively.

If a UE indicates a carrier aggregation capability larger than K serving cells with configuration for PDCCH monitoring capability per multiple slots, e.g. monitoringCapabilityConfig=r17monitoringcapability, or larger than L serving cells with configuration for PDCCH monitoring capability per slot, e.g. monitoringCapabilityConfig=r15monitoringcapability, the UE includes in higher layer parameter, for example, UE-NR-Capability-17 an indication for a maximum number of PDCCH candidates and for a maximum number of non-overlapped CCEs the UE can monitor for downlink cells with configuration for PDCCH monitoring capability per multiple slots or for downlink cells with configuration for PDCCH monitoring capability per slot when the UE is configured for carrier aggregation operation over more than K+L cells with at least K downlink cell with monitoringCapabilityConfig=r17monitoringcapability and at least L downlink cells with monitoringCapabilityConfig=r15monitoringcapability.

When a UE is not configured for DC operation, the UE determines a capability to monitor a maximum number of PDCCH candidates and a maximum number of non-overlapped CCEs per multiple slots or per slot that corresponds to $N_{cells, r15}^{cap-r17}$ downlink cells, where, for example $N_{cells, r15}^{cap-r17}$ is the number of configured downlink serving cells if the UE does not provide pdcch-BlindDetectionCA1. Otherwise, If the UE reports on one combination of (pdcch-BlindDetectionCA1, pdcch-BlindDetectionCA3), $N_{cells, r15}^{r17}$ is the value of pdcch-BlindDetectionCA1, else $N_{cells, r15}^{cap-r17}$ is the value of pdcch-BlindDetectionCA1 from a combination of (pdcch-BlindDetectionCA1, pdcch-BlindDetectionCA3) that is provided by pdcch-BlindDetectionCA-CombiIndicator. Additionally, $N_{cells, r15}^{cap-r17}$ is the number of configured downlink serving cells if the UE does not provide pdcch-BlindDetectionCA3. Otherwise, If the UE reports on one combination of (pdcch-BlindDetectionCA1, pdcch-BlindDetectionCA3), $N_{cells, r15}^{cap-r17}$ is the value of pdcch-BlindDetectionCA3, else $N_{cells, r15}^{cap-r17}$ is the value of pdcch-BlindDetectionCA3 from a combination of (pdcch-BlindDetectionCA1, pdcch-BlindDetectionCA3) that is provided by pdcch-BlindDetectionCA-CombiIndicator.

When a UE (such as the UE 116) is configured for DC operation and is provided monitoringCapabilityConfig=r15monitoringcapability for at least L downlink cells and monitoringCapabilityConfig=r17monitoringcapability for at least K downlink cells where the UE monitors PDCCH, the UE determines a capability to monitor a maximum number of PDCCH candidates and a maximum number of non-overlapped CCEs that corresponds to (i) $N_{cells, r15}^{cap-r17}=N_{cells, r15}^{MCG}$ downlink cells for the MCG where $N_{cells, r15}^{MCG}$ is provided by a higher layer parameter for the MCG, for example BlindDetection_A, (ii) $N_{cells, r15}^{cap-r17}=N_{cells, r15}^{SCG}$ downlink cells for the SCG where $N_{cells, r15}^{SCG}$ is provided by a higher layer parameter for the SCG, for example BlindDetection_A, (iii) $N_{cells, r17}^{cap-r17}=N_{cells, r17}^{MCG}$ downlink cells for the MCG where $N_{cells, r17}^{MCG}$ is provided by a higher layer parameter for the MCG, for example BlindDetection_B, and (iv) $N_{cells,\ r17}^{cap-r17} = N_{cells,\ r17}^{SCG}$ downlink cells for the SCG where $N_{cells,\ r17}^{SCG}$ is provided by a higher layer parameter for the SCG, for example BlindDetection_B.

When the UE is configured for carrier aggregation operation over more than K+L cells with at least K downlink cell with monitoringCapabilityConfig=r17monitoringcapability and at least L downlink cells with monitoringCapabilityConfig=r15monitoringcapability or for a cell group when the UE is configured for NR-DC operation, the UE does not expect to: (i) monitor per group of $N_{slot}$ slots a number of PDCCH candidates or a number of non-overlapped CCEs that is larger than the maximum number as derived from the corresponding value of $N_{cells,\ r17}^{cap-r17}$ and (ii) monitor per slot a number of PDCCH candidates or a number of non-overlapped CCEs that is larger than the maximum number as derived from the corresponding value of $N_{cells,\ r17}^{cap-r17}$.

When a UE is configured for NR-DC operation with a total of $N_{NR-DC}^{DL,cells}$ downlink cells on both the MCG and the SCG and the UE is provided monitoringCapabilityConfig=r15monitoringcapability for $N_{NR-DC,r15}^{DL,cells}$ downlink cells and monitoringCapabilityConfig=r17monitoringcapability for $N_{NR-DC,r17}^{DL,cells}$ downlink cells where the UE monitors PDCCH, the UE expects to be provided pdcch-BlindDetection_A and pdcch-BlindDetection_B for the MCG. Here, BlindDetection_A and pdcch-BlindDetection_B for the SCG with values that satisfy Equations (3a) or (3b) as well as Equations (4a) or (4b).

pdcch-BlindDetection_A for the *MCG*+pdcch-Blind-Detection_A for the *SCG*<=pdcch-BlindDetectionCA1, if the *UE* reports pdcch-BlindDetectionCA1,      (3a)

pdcch-BlindDetection_A for the *MCG*+pdcch-Blind-Detection_A for the *SCG*<=$N_{NR-DC,r15}^{DL,cells}$, if the *UE* does not report pdcch-BlindDetectionCA1      (3b)

pdcch-BlindDetection_B for the *MCG*+pdcch-Blind-Detection_B for the *SCG*<=pdcch-BlindDetectionCA2, if the *UE* reports pdcch-BlindDetectionCA2      (4a)

pdcch-BlindDetection_B for the *MCG*+pdcch-Blind-Detection_B for the *SCG*<=$N_{NR-DC,r17}^{DL,cells}$, if the *UE* does not report pdcch-BlindDetectionCA2      (4b)

When a UE (such as the UE 116) is configured for DC operation and is provided monitoringCapabilityConfig=r15monitoringcapability for at least L downlink cells and monitoringCapabilityConfig=r17monitoringcapability for at least K downlink cells where the UE monitors PDCCH, the UE may indicate, through pdcch-BlindDetectionMCG-UE1 and pdcch-BlindDetectionSCG-UE1, respective maximum values for pdcch-BlindDetection_A for the MCG and pdcch-BlindDetection_A for the SCG, and through pdcch-BlindDetectionMCG-UE2 and pdcch-BlindDetectionSCG-UE2 respective maximum values for pdcch-BlindDetection_B for the MCG and pdcch-BlindDetection_B for the SCG.

For example, if the UE reports pdcch-BlindDetectionCA_A, then (i) the value range of pdcch-BlindDetectionMCG-UE1 or of pdcch-BlindDetectionSCG-UE1 is [1, . . . , pdcch-BlindDetectionCA1], and (ii) pdcch-BlindDetectionMCG-UE1+pdcch-BlindDetectionSCG-UE1>=pdcch-BlindDetectionCA Otherwise, if $N_{NR-DC,max,r15}^{DL,cells}$ is a maximum total number of downlink cells the UE is provided monitoringCapabilityConfig=r15monitoringcapability and the UE can be configured on both the MCG and the SCG for NR-DC as indicated in UE-NR-Capability, then (i) the value range of pdcch-BlindDetectionMCG-UE1 or of pdcch-BlindDetectionSCG-UE1 is [0, 1, 2] or [3, 4] and (ii) dcch-BlindDetectionMCG-UE1+pdcch-BlindDetection-SCG-UE1>=$N_{NR-DC,max,r15}^{DL,cells}$.

For another example, if the UE reports pdcch-BlindDetectionCA_B, then (i) the value range of pdcch-BlindDetectionMCG-UE2 or of pdcch-BlindDetectionSCG-UE2 is [1, . . . , pdcch-BlindDetectionCA2], and (ii) pdcch-BlindDetectionMCG-UE2+pdcch-pdcch-BlindDetectionSCG-UE2>=pdcch-BlindDetectionCA2. Otherwise, if $N_{NR-DC,max,r17}^{DL,cells}$ is a maximum total number of downlink cells the UE is provided monitoringCapabilityConfig=r17monitoringcapability and the UE can be configured on both the MCG and the SCG for NR-DC as indicated in UE-NR-Capability, then (i) the value range of pdcch-BlindDetectionMCG-UE2 or of pdcch-BlindDetectionSCG-UE2 is [5, 6], and (ii) pdcch-BlindDetectionMCG-UE2+pdcch-BlindDetectionSCG-UE2>= $N_{NR-DC,max,r17}^{DL,cells}$.

If a UE is configured to monitor PDCCH per group of $N_{slot}$ slots for a serving cell, the UE obtains an indication to monitor PDCCH on the serving cell for a maximum number of PDCCH candidates and non-overlapping CCEs per group of $N_{slot}$ slots, as described in Table (1) and Table (2), below. It is noted that Table (1) describes the Maximum number $M_{PDCCH}^{max,slot,\mu}$ of monitored PDCCH candidates per $N_{slot}$ slots for a DL BWP with SCS configuration $\mu \in \{4,5,6\}$ for a single serving cell. Table (2) describes the maximum number $C_{PDCCH}^{max,slot,\mu}$ of non-overlapped CCEs per $N_{slot}$ slots for a DL BWP with SCS configuration $\mu \in \{4,5,6\}$ for a single serving cell.

TABLE 1

| $\mu$ | $N_{slot}$ | Maximum number of monitored PDCCH candidates per $N_{slot}$ slots and per serving cell $M_{PDCCH}^{max,\ Nslot,\ \mu}$ |
|---|---|---|
| 4 | 2 | 40 |
| 5 | 4 | 36 |
| 6 | 8 | 32 |

TABLE 2

| $\mu$ | $N_{slot}$ | Maximum number of non-overlapped CCEs per $N_{slot}$ slots and per serving cell $C_{PDCCH}^{max,\ Nslot,\ \mu}$ |
|---|---|---|
| 4 | 2 | 32 |
| 5 | 4 | 28 |
| 6 | 8 | 24 |

Various methods can be performed for a determination of per multi-slot PDCCH monitoring capability. In one method, the per multi-slot PDCCH monitoring capability includes maximum number $N_{PDCCH}^{max,N_{slot},\mu}$ of monitored PDCCH candidates per $N_{slot}>1$ slots for a DL BWP with SCS configuration, $\mu$, and maximum number $C_{PDCCH}^{max,N_{slot},\mu}$ of non-overlapped CCEs per $N_{slot}>1$ slots for a DL BWP with SCS configuration, $\mu$. In another method, the per multi-slot PDCCH monitoring capability includes maximum number $M_{PDCCH}^{max,(X,Y),\mu}$ of monitored PDCCH candidates per a multi-slot span up to Y slots for a DL BWP with SCS configuration, $\mu$, and maximum number $C_{PDCCH}^{max,(X,Y),\mu}$ of non-overlapped CCEs per a multi-slots span up to Y slots for a DL BWP with SCS configuration, pt. The UE supports PDCCH monitoring occasions in any slot based on search space set configuration with minimum time separation of X slots between to the first slot of any two consecutive multi-slots spans. A multi-slots span starts at a first slot where a PDCCH monitoring occasion starts and ends at a last slot where a PDCCH monitoring occasion ends, where the number of slots of the multi-slots span is up to Y. In yet another example of multi-slot PDCCH monitoring capability, UE can monitor per group of $N_{slot}=X$ slots according to combination of (X, Y). The PDCCH monitoring capability is according to a combination of (X, Y), where X and Y are numbers of consecutive slots, groups of X slots are consecutive and non-overlapping, and the Y slots are within the X slots. The first group of X slots starts from the beginning of a subframe. The start of two consecutive groups of Y slots is separated by X slots. UE determines a maximum number $M_{PDCCH}^{max,(X,Y),\mu}$ of monitored PDCCH candidates per group of X slots for a DL BWP with SCS configuration, $\mu$, and maximum number $C_{PDCCH}^{max,(X,Y),\mu}$ of non-overlapped CCEs per group of X slots.

If a UE is configured to monitor PDCCH over $N_{slot}$ slots for a serving cell, the UE obtains an indication to monitor PDCCH on the serving cell for a maximum number of PDCCH candidates and non-overlapping CCEs based on a combination (X, Y), are described in in Table (3) and table (4). It is noted that Table (3) describes Maximum number $M_{PDCCH}^{max,slot,\mu}$ of monitored PDCCH candidates per combination (X, Y) for a DL BWP with SCS configuration $\mu \in \{4,5,6\}$ for a single serving cell. Similarly, Table (4) describes Maximum number $C_{PDCCH}^{max,slot,\mu}$ of non-overlapped CCEs per combination (X, Y) for a DL BWP with SCS configuration $\mu \in \{4,5,6\}$ for a single serving cell.

TABLE 3

Maximum number of monitored PDCCH candidates combination (X, Y) and per serving cell $M_{PDCCH}^{max,(X,Y),\mu}$

| $\mu$ | (4, 1) | (8, 1) | (8, 2) |
|---|---|---|---|
| 4 | 40 | 44 | 48 |
| 5 | 36 | 40 | 44 |
| 6 | 32 | 36 | 40 |

TABLE 4

Maximum number of non-overlapped CCEs per combination (X, Y) and per serving cell $C_{PDCCH}^{max,(X,Y),\mu}$

| $\mu$ | (4, 1) | (8, 1) | (8, 2) |
|---|---|---|---|
| 4 | 32 | 48 | 56 |
| 5 | 28 | 32 | 48 |
| 6 | 24 | 28 | 32 |

If a UE does not report pdcch-BlindDetectionCA or is not provided BDFactorR, then $\gamma=R$. If the UE reports pdcch-BlindDetectionCA, then the UE can be indicated by BDFactorR either $\gamma=1$ or $\gamma=R$.

If a UE is configured with $N_{cells,0}^{DL,\mu}+N_{cells,1}^{DL,\mu}$ downlink cells for which the UE is configured to monitor PDCCH per $N_{slot}$ slots with associated PDCCH candidates monitored in the active DL BWPs of the scheduling cells using SCS configuration $\mu$ where $\Sigma_{\mu=0}^{3}(N_{cells,0}^{DL,\mu}+\gamma \cdot N_{cells,1}^{DL,\mu}) \leq N_{cells}^{cap}$ and the UE is not provided CORESETPoolIndex, the UE is not required to monitor on the active DL BWPs of the scheduling cells, (i) more than $M_{PDCCH}^{total,N_{slot},\mu}=M_{PDCCH}^{max,N_{slot},\mu}$ or $M_{PDCCH}^{total,(X,Y),\mu}=M_{PDCCH}^{max,(X,Y),\mu}$ PDCCH candidates or more than $C_{PDCCH}^{total,N_{slot},\mu}=C_{PDCCH}^{max,N_{slot},\mu}$ or $C_{PDCCH}^{total,(X,Y),\mu}=C_{PDCCH}^{max,(X,Y),\mu}$ non-overlapped CCEs per multi-slots PDCCH monitoring period for each scheduled cell when the scheduling cell is from the $N_{cells,0}^{DL,\mu}$ downlink cells, (ii) more than $M_{PDCCH}^{total,N_{slot},\mu}=\gamma \cdot M_{PDCCH}^{max,N_{slot},\mu}$ or $M_{PDCCH}^{total,(X,Y),\mu}=\gamma \cdot M_{PDCCH}^{max,(X,Y),\mu}$ PDDCH candidates or more than $C_{PDCCH}^{total,N_{slot},\mu}=\gamma \cdot C_{PDCCH}^{max,N_{slot},\mu}$ or $C_{PDCCH}^{total,(X,Y),\mu}=\gamma \cdot C_{PDCCH}^{max,(X,Y),\mu}$ non-overlapped CCEs per multi-slots for each scheduled cell when the scheduling cell is from the $N_{cells,1}^{DL,\mu}$ downlink cells, or (iii) more than $M_{PDCCH}^{max,N_{slot},\mu}$ or $M_{PDCCH}^{max,(X,Y),\mu}$ PDCCH candidates or more than $C_{PDCCH}^{max,N_{slot},\mu}$ or $C_{PDCCH}^{max,(X,Y),\mu}$ non-overlapped per multi-slots for CORE-SETs with same coresetPoolIndex CCEs value for each scheduled cell when the scheduling cell is from the $N_{cells,1}^{DL,\mu}$ downlink cells.

In certain embodiments, if a UE (i) is configured with $N_{cells,0}^{DL,\mu}+N_{cells,1}^{DL,\mu}$ downlink cells for which the UE is not provided monitoringCapabilityConfig, (ii) with associated PDCCH candidates monitored in the active DL BWPs of the scheduling cell(s) using SCS configuration $\mu$, as described in Equation (5), and (iii) a DL BWP of an activated cell is the active DL BWP of the activated cell, and a DL BWP of a deactivated cell is the DL BWP with index provided by firstActiveDownlinkBWP-Id for the deactivated cell, then the UE does not have to monitor various elements. For example, here, the UE does not have to monitor more PDCCH candidates as described in Equation (6) or Equation (7). Additionally, the UE does not have to monitor more non-overlapped CCEs per slot on the active DL BWP(s) of scheduling cell(s) from the $N_{cells,0}^{DL,\mu}+N_{cells,1}^{DL,\mu}$ downlink cells as described in Equation (8) or Equation (9).

$$\Sigma_{\mu=0}^{3}(N_{cells,0}^{DL,\mu}+\gamma \cdot N_{cells,1}^{DL,\mu})>N_{cells}^{cap} \tag{5}$$

$$M_{PDCCH}^{total,N,\mu}=\lfloor N_{cells}^{cap} \cdot M_{PDCCH}^{max,N,\mu} \cdot (N_{cells,0}^{DL,\mu}+\gamma \cdot N_{cells,1}^{DL,\mu})/\Sigma_{j=\mu_{min}}^{\mu_{max}}(N_{cells,0}^{DL,j}+\gamma \cdot N_{cells,1}^{DL,j})\rfloor \tag{6}$$

$$M_{PDCCH}^{total,(X,Y),\mu}=\lfloor N_{cells}^{cap} \cdot M_{PDCCH}^{max,(X,Y),\mu} \cdot (N_{cells,0}^{DL,\mu}+\gamma \cdot N_{cells,1}^{DL,\mu})/\Sigma_{j=\mu_{min}}^{\mu_{max}}(N_{cells,0}^{DL,j}+\gamma \cdot N_{cells,1}^{DL,j})\rfloor \tag{7}$$

$$C_{PDCCH}^{total,N,\mu}=\lfloor N_{cells}^{cap} \cdot C_{PDCCH}^{max,N,\mu} \cdot (N_{cells,0}^{DL,\mu}+\gamma \cdot N_{cells,1}^{DL,\mu})/\Sigma_{j=\mu_{min}}^{\mu_{max}}(N_{cells,0}^{DL,j}+\gamma \cdot N_{cells,1}^{DL,j})\rfloor \tag{8}$$

$$C_{PDCCH}^{total,(X,Y),\mu}=\lfloor N_{cells}^{cap} \cdot C_{PDCCH}^{max,(X,Y),\mu} \cdot (N_{cells,0}^{DL,\mu}+\gamma \cdot N_{cells,1}^{DL,\mu})/\Sigma_{j=\mu_{min}}^{\mu_{max}}(N_{cells,0}^{DL,j}+\gamma \cdot N_{cells,1}^{DL,j})\rfloor \tag{9}$$

If a UE is configured only with $N_{cells,r17}^{DL,\mu}$ downlink cells for which the UE is provided monitoringCapabilityConfig=r17monitoringcapability and with associated PDCCH candidates monitored in the active DL BWPs of the scheduling cells using SCS configuration $\mu$, and with $N_{cells,r17}^{DL,(X,Y),\mu}$ of the $N_{cells,r17}^{DL,\mu}$ downlink cells using combination (X, Y) for PDCCH monitoring, where $\Sigma_{\mu=\mu_{min}}^{\mu_{max}}N_{cells,r17}^{DL,\mu}>N_{cells}^{cap-r17}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than PDCCH candidates as described in Equation (10) or more than non-overlapped CCEs as described in Equation (11). This is per set of groups of X slots on the active DL BWP(s) of all scheduling cell(s) from the $N_{cells,r17}^{DL,(X,Y),\mu}$ downlink cells within every X slots.

$$M_{PDCCH}^{total,(X,Y),\mu}=\lfloor N_{cells}^{cap-r17} \cdot M_{PDCCH}^{max,(X,Y),\mu} \cdot N_{cells,r17}^{DL,(X,Y),\mu}/\Sigma_{j=\mu_{min}}^{\mu_{max}}N_{cells,r17}^{DL,j}\rfloor \tag{10}$$

$$C_{PDCCH}^{total,(X,Y),\mu}=\lfloor N_{cells}^{cap-r17} \cdot C_{PDCCH}^{max,(X,Y),\mu} \cdot N_{cells,r17}^{DL,(X,Y),\mu}/\Sigma_{j=\mu_{min}}^{\mu_{max}}N_{cells,r17}^{DL,j}\rfloor \tag{11}$$

Here, $N_{cells,r17}^{DL,j}$ is a number of configured cells with associated PDCCH candidates monitored in the active DL BWPs of the scheduling cells using SCS configuration j. $N_{cells,r17}^{DL,(X,Y),\mu}$ of the $N_{cells,r17}^{DL,\mu}$ downlink cells are scheduled cells using the PDCCH monitoring capability according to the combination (X, Y), If a UE is configured with downlink cells for which the UE is provided both monitoringCapabilityConfig=r15monitoringcapability and monitoringCapabilityConfig=r17monitoringcapability, $N_{cells}^{cap-r17}$ is replaced by $N_{cells,\ r17}^{cap-r17}$.

In certain embodiments, for each scheduled cell from the $N_{cells,0}^{DL,\mu}$ downlink cells, the UE does not have to monitor the active DL BWP with SCS configuration μ of the scheduling cell more than $\min(M_{PDCCH}^{max,N_{slot},\mu}, M_{PDCCH}^{total,N_{slot},\mu})$ or $\min(M_{PDCCH}^{max,(X,\ Y),\mu}, M_{PDCCH}^{total,(X,\ Y),\mu})$ of the PDCCH candidates. Similarly, the UE does not have to monitor more than $\min(C_{PDCCH}^{max,N_{slot},\mu}, C_{PDCCH}^{total,N_{slot},\mu})$ or $\min(C_{PDCCH}^{max,(X,\ Y),\mu}, C_{PDCCH}^{total,(X,\ Y),\mu})$ of the non-overlapped CCEs per $N_{slot}$ slots.

For each scheduled cell from the $N_{cells,1}^{DL,\mu}$ downlink cells, the UE does not have to monitor on the active DL BWP with SCS configuration μ of the scheduling cell more than $\min(\gamma \cdot M_{PDCCH}^{max,N_{slot},\mu}, M_{PDCCH}^{total,N_{slot},\mu})$ or $\min(\gamma \cdot M_{PDCCH}^{max,(X,Y),\mu}, M_{PDCCH}^{total,(X,Y),\mu})$ PDCCH candidates or more than $\min(\gamma \cdot C_{PDCCH}^{max,N_{slot},\mu}, C_{PDCCH}^{total,N_{slot},\mu})$ or $\min(\gamma \cdot C_{PDCCH}^{max,(X,Y),\mu}, C_{PDCCH}^{total,(X,Y),\mu})$ non-overlapped CCEs per $N_{slot}$ slots. Similarly, for each scheduled cell from the $N_{cells,1}^{DL,\mu}$ downlink cells, the UE does not have to monitor on the active DL BWP with SCS configuration μ of the scheduling cell more than $\min(M_{PDCCH}^{max,N_{slot},\mu}, M_{PDCCH}^{total,N_{slot},\mu})$ or $\min(M_{PDCCH}^{max,(X,Y),\mu}, M_{PDCCH}^{total,(X,Y),\mu})$ PDCCH candidates or more than $\min(C_{PDCCH}^{max,N_{slot},\mu}, C_{PDCCH}^{total,N_{slot},\mu})$ or $\min(C_{PDCCH}^{max,(X,Y),\mu}, C_{PDCCH}^{total,(X,Y),\mu})$ non-overlapped CCEs per $N_{slot}$ slots for CORESETs with same coreset-PoolIndex value.

Although FIG. 6 illustrate the method 600 various changes may be made to FIG. 6. For example, while the method 600 of FIG. 6 is shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure also describe PDCCH dropping/overbooking per multi-slots. The following examples and embodiments, such as those of FIG. 7 PDCCH dropping/overbooking per multi-slots.

For example, embodiments of this disclosure considers PDCCH candidates allocation or dropping for a multi-slot PDCCH monitoring period of $N_{slot}>1$ consecutive slots. In one example of multi-slot PDCCH monitoring capability, UE can monitor per group of $N_{slot}=X$ slots according to combination of (X, Y). The PDCCH monitoring capability is according to a combination of (X, Y), where X and Y are numbers of consecutive slots, groups of X slots are consecutive and non-overlapping, and the Y slots are within the X slots. The first group of X slots starts from the beginning of a subframe. The start of two consecutive groups of Y slots is separated by X slots. The UE determines a span configured with a number of PDCCH candidates according to the combination of (X, Y).

For a UE provided with the per multi-slot PDCCH monitoring capability in a DL BWP with SCS configuration μ for PDCCH reception, the UE determines a multi-slot PDCCH monitoring period starts in a slot with number $n_{start}$ in a frame with number $n_f$ if $(n_f \cdot N_{slot}^{frame,\mu} + n_{start} - O_{slot})$ mod $N_{slot}=0$, where $N_{slot}^{frame,\mu}$ is number of slots per frame for the DL BWP, $O_{slot}$ is offset that can be, for example, provided by higher layers or have a predetermined value such as $O_{slot}=0$.

The UE can be configured with PDCCH monitoring occasions in a number of $Z_{slot}$ consecutive slots within the $N_{slot}$ slots, where $Z_{slot} \leq N_{slot}$. When $Z_{slot}=N_{slot}$, the UE can be configured with PDCCH monitoring occasions in any of the $N_{slot}$ slots. The start of the number of $Z_{slot}$ consecutive slots can be determined based on one of the following two methods. In one example, the start of the $Z_{slot}$ consecutive slots is fixed and defined in the specifications of the system operation. For example, $Z_{slot}$ can be the first slot of the $N_{slot}$ slots. In another example, the start of the $Z_{slot}$ consecutive slots is determined based on the configuration from higher layers. For example, the configuration of search space set(s) can include a value of $Z_{slot}$.

In certain embodiments, the UE determines the applicable value for $N_{slot}$ or $O_{slot}$ based on one of the following three methods. In one method, $N_{slot}$ or $O_{slot}$ is defined in the specifications of system operation per SCS configuration pt. For example, $N_{slot}=2$ for μ=4 or $N_{slot}=4$ for μ=5, or $N_{slot}=8$ for μ=6 and $O_{slot}=0$. In another method, $N_{slot}$ or $O_{slot}$ is reported by the UE to the network as a UE capability or assistance information. In yet another method, $N_{slot}$ or $O_{slot}$ is provided to the UE by higher layer signaling.

For all search space sets within a slot n or within $N_{slot}$ slots, denote by $S_{css}$ a set of CSS sets with cardinality of $I_{CSS}$ and by $S_{USS}$ a set of USS sets with cardinality of $J_{uss}$. The location of USS sets $s_j$, $0 \leq j \leq J_{USS}$, in $S_{USS}$ is according to an ascending order of the search space set index.

Denote by $M_{S_{css}(i)}^{(L)}$, $0 \leq i \leq I_{css}$ the number of counted PDCCH candidates for monitoring for CSS set $S_{css}(i)$ and by $M_{S_{css}(j)}^{(L)}$, $0 \leq j \leq J_{USS}$, the number of counted PDCCH candidates for monitoring for USS set $S_{uss}(i)$.

For the CSS sets, a UE (such as the UE 116) monitors a number of PDCCH candidates, as described in Equation (12), m which uses a total of $C_{PDCCH}^{CSS}$ non-overlapping CCEs in $N_{slot}$ slots.

$$M_{PDCCH}^{CSS} = \sum_{i=0}^{I_{css}-1} \sum_{L} M_{S_{css}(i)}^{(L)} \tag{12}$$

In a first approach, if a UE (such as the UE 116) is configured to monitor PDCCH per $N_{slot}$ slots for the primary cell, the UE allocates PDCCH candidates for monitoring to USS sets for the primary cell having an active DL BWP with SCS configuration μ per $N_{slot}$ slots according to the following pseudocode. If for the USS sets for scheduling on the primary cell the UE is not provided coresetPoolIndex for first CORESETs, or is provided coresetPoolIndex with value 0 for first CORESETs, and is provided coresetPoolIndex with value 1 for second CORESETs, and if Equation (13) or Equation (14) are satisfied, Syntax (1) applies. It is noted that Syntax (1) applies only USS sets associated with the first CORESETs. A UE does not expect to monitor PDCCH in a USS set without allocated PDCCH candidates for monitoring.

$$\min(\gamma \cdot M_{PDCCH}^{max,N_{slot},\mu}, M_{PDCCH}^{total,N_{slot},\mu}) > \min(M_{PDCCH}^{max,N_{slot},\mu}, M_{PDCCH}^{total,N_{slot},\mu}) \tag{13}$$

$$\min(\gamma \cdot C_{PDCCH}^{max,N_{slot},\mu}, C_{PDCCH}^{total,N_{slot},\mu}) > \min(C_{PDCCH}^{max,N_{slot},\mu}, C_{PDCCH}^{total,N_{slot},\mu}) \tag{14}$$

Syntax (1)

Denote by $V_{CCE}(S_{USS}(j))$ the set of non-overlapping CCEs for search space set $S_{USS}(j)$ and by $\varphi(V_{CCE}(S_{USS}(j)))$ the cardinality of $V_{CCE}(S_{USS}(j))$ where the non-overlapping CCEs for search space set $s_{uss}(j)$ are determined considering the allocated PDCCH candidates for monitoring for the CSS sets and the allocated PDCCH candidates for monitoring for all search space sets $S_{USS}(k)$, $0 \leq k \leq j$.

Set $M_{PDCCH}{}^{uss} = \min(M_{PDCCH}{}^{max,N_{slot},\mu}, M_{PDCCH}{}^{total,N_{slot},\mu}) - M_{PDCCH}{}^{css}$ Set $C_{PDCCH}{}^{uss} = \min(C_{PDCCH}{}^{max,N_{slot},\mu}, C_{PDCCH}{}^{total,N_{slot},\mu}) - M_{PDCCH}{}^{css}$ Set $j = 0$ While $$\sum_L M_{S_{USS}(j)}^{(L)} \leq M_{PDCCH}^{uss} \text{ AND } \varphi(V_{CCE}(S_{USS}(j))) \leq C_{PDCCH}^{USS}$$

allocate $$\sum_L M_{S_{USS}(j)}^{(L)} PDCCH$$

candidates for monitoring to USS set $S_{USS}(j)$ $$M_{PDCCH}^{uss} = M_{PDCCH}^{uss} - \sum_L M_{S_{USS}(j)}^{(L)};$$

$$C_{PDCCH}{}^{uss} = C_{PDCCH}{}^{uss} - \varphi(V_{CCE}(S_{USS}(j)));$$

$j = j+1;$ end while If the multi-slot PDCCH monitoring capability is based on a combination of (X,Y), $M_{PDCCH}{}^{max,N_{slot},\mu}$, $M_{PDCCH}{}^{total,N_{slot},\mu}$ are replaced by $M_{PDCCH}{}^{max,(X,Y),\mu}$, $M_{PDCCH}{}^{total,(X,Y),\mu}$, respectively, and $C_{PDCCH}{}^{max,N_{slot},\mu}$, $C_{PDCCH}{}^{total,N_{slot},\mu}$ are replaced by $C_{PDCCH}{}^{max,(X,Y),\mu}$, $C_{PDCCH}{}^{total,(X,Y),\mu}$.

Un a second approach, if a UE (such as the UE 116) is configured to monitor PDCCH per $N_{slot}$ slots for the primary cell, the UE allocates PDCCH candidates for monitoring to USS sets for the primary cell having an active DL BWP with SCS configuration $\mu$ according to the following pseudocode. The UE allocates PDCCH candidates to search space sets in slot n, where $n_{start} \leq n \leq n_{start} + N_{slot} - 1$. The UE does not expect to monitor PDCCH in a search space set without allocated PDCCH candidates for monitoring. This is described in Syntax (2) below.

Syntax (2)

Set $n = 0$

Set $M_{PDCCH}{}^{max} = \min(M_{PDCCH}{}^{max,N_{slot},\mu}, M_{PDCCH}{}^{total,N_{slot},\mu})$ Set $C_{PDCCH}{}^{max} = \min(C_{PDCCH}{}^{max,N_{slot},\mu}, C_{PDCCH}{}^{total,N_{slot},\mu})$ while $n + n_{start} \leq n_{start} + N - 1$ For all search space sets within the slot $n + n_{start}$ denote by $S_{CSS}$ a set of CSS sets with cardinality of $I_{CSS}$ and by $S_{USS}$ a set of USS sets with cardinality of $J_{USS}$. The location of USS sets $S_j$, $0 \leq j < J_{USS}$, in $S_{USS}$ is according to an ascending order of the search space set index. Denote by $M_{S_{CSS}(i)}{}^{(L)}$, $0 \leq i < I_{CSS}$, the number of counted PDCCH candidates for monitoring for CSS set $S_{CSS}(i)$ and by $M_{S_{USS}(j)}{}^{(L)}$, $0 \leq j < J_{USS}$, the number of counted PDCCH candidates for monitoring for USS set $S_{USS}(j)$. For the CSS sets, the UE monitors $M_{PDCCH}{}^{CSS} = \Sigma_{i=0}{}^{I_{CSS}-1} \Sigma_L M_{S_{CSS}(i)}{}^{(L)}$ PDCCH candidates requiring a total of $C_{PDCCH}{}^{CSS}$ non-overlapping CCEs in the slot $n + n_{start}$ if $M_{PDCCH}{}^{CSS} \leq M_{PDCCH}{}^{max}$ and $C_{PDCCH}{}^{CSS} \leq C_{PDCCH}{}^{max}$. The UE allocates PDCCH candidates for monitoring to USS sets for the primary cell having an active DL BWP with SCS configuration $\mu$ in the slot $n + n_{start}$ according to the following pseudo-code. The UE does not expect to monitor PDCCH in a USS set without allocated PDCCH candidates for monitoring.

Denote by $V_{CCE}(S_{USS}(j))$ the set of non-overlapping CCEs for search space set $S_{uss}(j)$ and by $\varphi(V_{CCE}(S_{USS}(j)))$ the cardinality of $V_{CCE}(S_{USS}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \leq k \leq j$.

Set $M_{PDCCH}{}^{max} = M_{PDCCH}{}^{max} - M_{PDCCH}{}^{CSS}$

Set $C_{PDCCH}{}^{max} = C_{PDCCH}{}^{max} - C_{PDCCH}{}^{CSS}$

Set $M_{PDCCH}{}^{USS} = M_{PDCCH}{}^{max}$

Set $C_{PDCCH}{}^{USS} = C_{PDCCH}{}^{max}$

Set $j = 0$ while $$\sum_L M_{S_{USS}(j)}^{(L)} \leq M_{PDCCH}^{uss} \text{ AND } \varphi(V_{CCE}(S_{USS}(j))) \leq C_{PDCCH}^{USS}$$

allocate $$\sum_L M_{S_{USS}(j)}^{(L)} PDCCH$$

candidates for monitoring to USS set $S_{uss}(j)$ $$M_{PDCCH}^{uss} = M_{PDCCH}^{uss} - \sum_L M_{S_{USS}(j)}^{(L)};$$

$$C_{PDCCH}^{uss} = C_{PDCCH}^{uss} - \varphi(V_{CCE}(S_{USS}(j)));$$

$$M_{PDCCH}^{max} = M_{PDCCH}^{max} - \sum_L M_{S_{USS}(j)}^{(L)};$$

$$C_{PDCCH}^{max} = C_{PDCCH}^{max} - \varphi(V_{CCE}(S_{USS}(j)));$$

$j = j + 1$ end while $n = n + 1;$ end while

If the multi-slot PDCCH monitoring capability is based on a combination of (X,Y), $M_{PDCCH}{}^{max,N_{slot},\mu}$, $M_{PDCCH}{}^{total,N_{slot},\mu}$ are replaced by $M_{PDCCH}{}^{max,(X,Y),\mu}$,

25

$M_{PDCCH}^{total,(X,Y),\mu}$, respectively. And $C_{PDCCH}^{max,N_{slot},\mu}$, $C_{PDCCH}^{total,N_{slot},\mu}$ are replaced by $C_{PDCCH}^{max,(X,Y),\mu}$, $C_{PDCCH}^{total,(X,Y),\mu}$.

In a third approach, if a UE is configured to monitor PDCCH per $N_{slot}$ slots for the primary cell based on combination (X, Y), where X or Y is larger than one slot, the UE allocates PDCCH candidates for monitoring to USS sets for the primary cell having an active DL BWP with SCS configuration $\mu$ according Syntax (3). The UE allocates PDCCH candidates to search space sets in slot n, where $n_{start} \leq n \leq n_{start} + N_{slot} - 1$. The UE does not expect to monitor PDCCH in a search space set without allocated PDCCH candidates for monitoring. This is described in Syntax (3) below.

Syntax (3)

Set $n=0$

Set $M_{PDCCH}^{max} = \min(M_{PDCCH}^{max,(X,Y),\mu}, M_{PDCCH}^{total,(X,Y),\mu})$ Set $C_{PDCCH}^{max} = \min(C_{PDCCH}^{max,(X,Y),\mu}, C_{PDCCH}^{total,(X,Y),\mu})$ while $n + n_{start} \leq n_{start} N-1$ For all search space sets within the slot $n + n_{start}$ denote by $S_{CSS}$ a set of CSS sets with cardinality of $I_{CSS}$ and by $S_{USS}$ a set of USS sets with cardinality of $J_{USS}$. The location of USS sets $S_j$, $0 \leq j < f_{USS}$, in $S_{USS}$ is according to an ascending order of the search space set index. Denote by $M_{S_{CSS}(i)}^{(L)}$, $0 \leq i < I_{CSS}$, the number of counted PDCCH candidates for monitoring for CSS set $S_{CSS}(i)$ and by $M_{S_{USS}(j)}^{(L)}$, $0 \leq j < J_{USS}$, the number of counted PDCCH candidates for monitoring for USS set $S_{USS}(j)$. For the CSS sets, the UE monitors $M_{PDCCH}^{CSS} = \Sigma_{i=0}^{I_{CSS}-1} \Sigma_L M_{S_{CSS}(i)}^{(L)}$ PDCCH candidates requiring a total of $C_{PDCCH}^{CSS}$ non-overlapping CCEs in the slot $n + n_{start}$ if $M_{PDCCH}^{CSS} \leq M_{PDCCH}^{max}$ and $C_{PDCCH}^{CSS} \leq C_{PDCCH}^{max}$. The UE allocates PDCCH candidates for monitoring to USS sets for the primary cell having an active DL BWP with SCS configuration $\mu$ in the slot $n + n_{start}$ according to the following pseudo-code. The UE does not expect to monitor PDCCH in a USS set without allocated PDCCH candidates for monitoring.

Denote by $V_{CCE}(S_{USS}(j))$ the set of non-overlapping CCEs for search space set $S_{uss}(j)$ and by $\varphi(V_{CCE}(S_{USS}(j)))$ the cardinality of $V_{CCE}(S_{USS}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \leq k \leq j$ Set $M_{PDCCH}^{max} = M_{PDCCH}^{max} - M_{PDCCH}^{CSS}$ Set $C_{PDCCH}^{max} = C_{PDCCH}^{max} - C_{PDCCH}^{CSS}$ Set $M_{PDCCH}^{USS} = M_{PDCCH}^{max}$ Set $C_{PDCCH}^{USS} = C_{PDCCH}^{max}$ Set $j=0$

26 while $$\sum_L M_{S_{USS}(j)}^{(L)} \leq M_{PDCCH}^{uss} \text{ AND } \varphi(V_{CCE}(S_{USS}(j))) \leq C_{PDCCH}^{USS}$$

allocate $$\sum_L M_{S_{USS}(j)}^{(L)} PDCCH$$

candidates for monitoring to USS set $S_{USS}(j)$ $$M_{PDCCH}^{uss} = M_{PDCCH}^{uss} - \sum_L M_{S_{USS}(j)}^{(L)};$$

$$C_{PDCCH}^{uss} = C_{PDCCH}^{uss} - \varphi(V_{CCE}(S_{USS}(j)));$$

$$M_{PDCCH}^{max} = M_{PDCCH}^{max} - \sum_L M_{S_{USS}(j)}^{(L)};$$

$$C_{PDCCH}^{max} = C_{PDCCH}^{max} - \varphi(V_{CCE}(S_{USS}(j)));$$

$$j = j + 1$$

end while
n=n+1;
end while.

Figure 7:
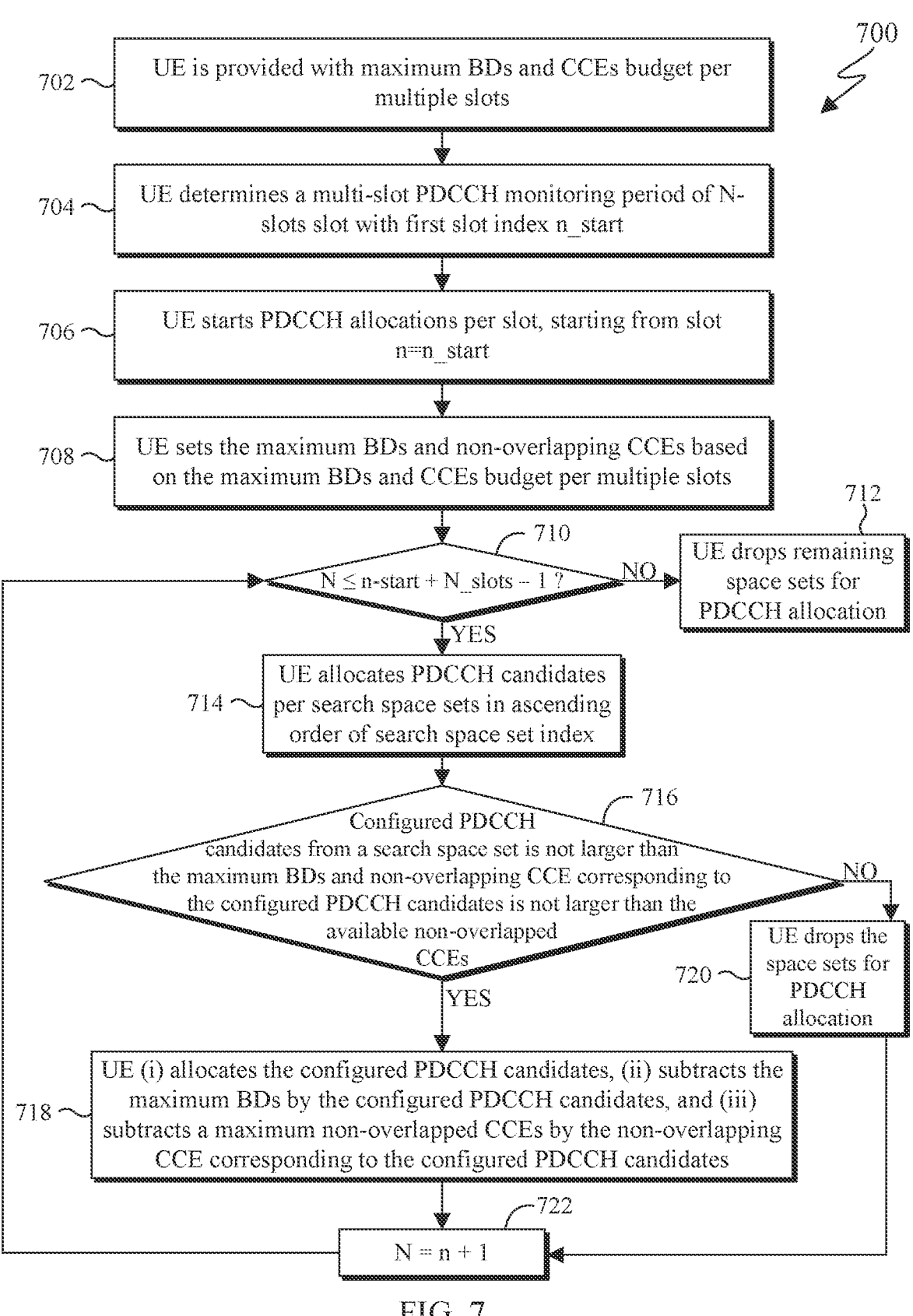
FIG. 7 illustrates an example method of a UE procedure for PDCCH allocation or dropping based on PDCCH monitoring capability per multiple slots according to embodiments of present disclosure.

FIG. 7 illustrates an example method 700 of a UE procedure for PDCCH allocation or dropping based on PDCCH monitoring capability per multiple slots according to embodiments of present disclosure. The steps of the method 700 can be performed by any of the UEs 111-116 of FIG. 1, such as the UE 116 of FIG. 3. The method 700 of FIG. 7 is for illustration only and other embodiments can be used without departing from the scope of the present disclosure.

In step 702, a UE (such as the UE 116) UE is provided with maximum BDs and CCEs budget per multiple slots, e.g. $M_{PDCCH}^{max,N_{slot},\mu}$, $C_{PDCCH}^{max,N_{slot},\mu}$. In step 704, the UE determines a multi-slot PDCCH monitoring period of N_slots slot with first slot index n_start. In step 706, the UE starts PDCCH allocations per slot, starting from slot n=n_start for the multi-slot PDCCH monitoring period. In step 708, the UE sets the maximum BDs and non-overlapped CCEs based on the maximum BDs and CCEs budget per multiple slots. An example of the max BDs and non-overlapped CCEs are described in in Equations (15) and (16), below.

$$M_{PDCCH}^{max} = \min(M_{PDCCH}^{max,N_{slot},\mu}, M_{PDCCH}^{total,N_{slot},\mu}) \quad (15)$$

$$C_{PDCCH}^{max} = \min(C_{PDCCH}^{max,N_{slot},\mu}, C_{PDCCH}^{total,N_{slot},\mu}) \quad (16)$$

In step 710, the UE determines whether a slot, n, is smaller or equal to the expression described in Equation (17).

$$n + n_{start} \leq n_{start} + N-1 \quad (17)$$

If the slot, n, is larger than the expression described in Equation (17) above (as determined in step 710), the UE in step 712, drops PDCCH allocation for remaining search space sets. Alternatively, if the slot, n, is less than or equal to the expression described in Equation (17) above (as determined in step 710), the UE in step 714, allocates PDCCH candidate per search space sets in ascending order of search space set index.

For a search space set, the UE in step 716 determines whether configured PDCCH is not larger than the available BDs and non-overlapping CCE corresponding to the configured PDCCH candidates is not larger than the available non-overlapped CCEs. If the configured PDCCH is not larger than the available BDs and non-overlapping CCE corresponding to the configured PDCCH candidates is not larger than the available non-overlapped CCEs (as determined in step 716), the UE allocates the configured PDCCH candidates for the search space set, subtracts the maximum BDs by the configured PDCCH candidates, and subtracts the maximum non-overlapped CCEs by the non-overlapping CCE corresponding to the configured PDCCH candidates. Otherwise, the UE in step 720 drops PDCCH allocation for the search space set.

In step 722, the UE increase slot index n by one after performing step 718 or step 720. Thereafter the process returns to step 710, for the UE to determines whether a slot, n, is smaller or equal to the expression described in Equation (17), above.

Although FIG. 7 illustrate the method 700 various changes may be made to FIG. 7. For example, while the method 700 of FIG. 7 is shown as a series of steps, various steps could overlap, occur in parallel, occur in a different order, or occur multiple times. In another example, steps may be omitted or replaced by other steps. For example, steps of the method 700 can be executed in a different order.

Embodiments of the present disclosure further describe multi-slot PDCCH monitoring capability reports.

For example, embodiments of this disclosure considers UE capability report for PDCCH monitoring per $N_{slot} > 1$ slots.

In a first approach, a UE can report one or more value(s) for $N_{slot}$ as defined in the previous embodiment (describing PDCCH dropping/overbooking per multi-slots) of this disclosure. A UE (such as the UE 116) determines a capability to monitor a maximum number of PDCCH candidates and a maximum number of non-overlapped CCEs per $N_{slot}$ slots according to a value from the one or more values, that is associated with the largest maximum number of $M_{PDCCH}^{max,N_{slot},\mu}$ and $C_{PDCCH}^{max,N_{slot},\mu}$.

In a second approach of UE capability report for per multi-slot PDCCH monitoring, a UE (such as the UE 116) can report one or more value(s) for $Z_{slot}$ as defined in the previous embodiment (describing PDCCH dropping/overbooking per multi-slots) of this disclosure.

In a third approach of UE capability report for per multi-slot PDCCH monitoring, a UE (such as the UE 116) can report a value for $M_{PDCCH}^{max,N_{slot},\mu}$ or $C_{PDCCH}^{max,N_{slot},\mu}$. For example, more than one candidate values for $M_{PDCCH}^{max,N_{slot},\mu}$ or $C_{PDCCH}^{max,N_{slot},\mu}$ can be pre-defined. The UE capability report for PDCCH monitoring over multiple $N_{slot}$ slots includes one of the candidate values $M_{PDCCH}^{max,N_{slot},\mu}$ or $C_{PDCCH}^{max,N_{slot},\mu}$. For another example, a value for $M_{PDCCH}^{max,N_{slot},\mu}$ or $C_{PDCCH}^{max,N_{slot},\mu}$ can be based on other UE capabilities, such as a number of receiver antennas or maximum transmission or reception BW. The UEs with same number of receiver antennas or maximum transmission or reception BW have the same value for $M_{PDCCH}^{max,N_{slot},\mu}$ or $C_{PDCCH}^{max,N_{slot},\mu}$.

In a fourth approach of UE capability report for per multi-slot PDCCH monitoring, a UE (such as the UE 116) can report one or more combination(s) of $(N_{slot}, Z_{slot})$, where $N_{slot}$ and $Z_{slot}$ are defined in the previous embodiment (describing PDCCH dropping/overbooking per multi-slots) of this disclosure. The UE determines a capability to monitor a maximum number of PDCCH candidates and a maximum number of non-overlapped CCEs per $N_{slot}$ slots according to a value from the one or more combinations, that is associated with the largest maximum number of $M_{PDCCH}^{max,(N_{slot},Z_{slot}),\mu}$ and $C_{PDCCH}^{max,(N_{slot},Z_{slot}),\mu}$.

In a fifth approach of UE capability report for per multi-slot PDCCH monitoring, a UE (such as the UE 116) can report one or more combination(s) of (X2, Y2), where X2 and Y2 are defined in below (with respect to the description describing the CCE location determination). The UE determines a capability to monitor a maximum number of PDCCH candidates and a maximum number of non-overlapped CCEs per span according to a value from the one or more combinations, that is associated with the largest maximum number of $M_{PDCCH}^{max,(X2,Y2),\mu}$ and $C_{PDCCH}^{max,(X2,Y2),\mu}$.

In a sixth approach of UE capability report for per multi-slot PDCCH monitoring, a UE (such as the UE 116) can report one or more X1 or Y1, where X1 and Y1 are defined below (with respect to the description describing the CCE location determination). The UE determines a capability to monitor a maximum number of PDCCH candidates and a maximum number of non-overlapped CCEs per a PDCCH monitoring duration of X1 slots according to a value from the one or more X1 or Y2, that is associated with the largest maximum number of PDCCH candidates per X1 slots, i.e. $M_{PDCCH}^{max,X1,\mu}$, $M_{PDCCH}^{max,Y1,\mu}$, or $M_{PDCCH}^{max,(X1,Y1),\mu}$ and maximum number of non-overlapping CCEs per X1 slots, i.e. $C_{PDCCH}^{max,X1,\mu}$, $C_{PDCCH}^{max,Y1,\mu}$, or $C_{PDCCH}^{max,(X1,Y1),\mu}$.

Additionally, embodiments of the present disclosure describe CCE location determination.

For example, embodiments of this disclosure considers a determination of CCE indexes for a PDCCH candidate according to multi-slot based PDCCH monitoring capability.

In certain embodiments, a UE can be configured with a multi-slot based PDCCH monitoring capability for PDCCH monitoring in an active DL BWP of a serving cell. The UE is configured with a search space set, s, and CORESET, p, for multi-slot based PDCCH monitoring in the active DL BWP.

In a first method of multi-slot based PDCCH monitoring capability, the UE (such as the UE 116) determines a PDCCH monitoring duration of X1>1 consecutive slots. The UE is configured with a number of PDCCH candidates to monitor in Y1 consecutive symbols or slots within the X1 slots. In one example, the Y1 consecutive symbols or slots can start from the first slot of the X1 slots. In another example, the Y1 consecutive symbols or slots can start from any slot within the X1 slots configured by the higher layer, such as based on search space set configuration.

For a search space set, s, associated with CORESET, p, the UE determines a number of PDCCH candidates in a PDCCH monitoring occasion within a PDCCH monitoring duration of X1 slots. Each of the PDCCH candidates consists of a number of CCEs. The CCE indexes for aggregation level L corresponding to PDCCH candidate $m_{s,n_{CI}}$ of the search space set for the active DL BWP of the serving cell corresponding to carrier indicator field value $n_{CI}$ is described in Equation (18), below.

$$L \cdot \left\{ \left( Y + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad (18)$$

It is noted that Equation (18) can be used for any CSS where Z=0. For example, for any USS, one of the following method can be used. In one method, $Y = Y_{p,X1 \cdot n_{s,f}^\mu} = (A_p \cdot Y_{p,X1 \cdot (n_{s,f}^\mu - 1)}) \mod D$, $Y_{p,-X1} = n_{RNTI} \neq 0$, $A_p = 39827$ for pmod3=0, $A_p$=39829 for pmod3=1, $A_p$=39839 for pmod3=2, and D=65537, where $n_{s,f}^{\mu}$ is the index of the first slot from the X1 slots. $Y=Y_{p,X1,n_{s,f}^{\mu}}$ is used to determine CCE indexes for each PDCCH candidate in any PDCCH monitoring occasion within the PDCCH monitoring duration of X1 slots. In another method, $Y=Y_{p,n_{s,f}^{\mu}}=(A_p\cdot Y_{p,n_{s,f}^{\mu}-X1})$ modD, $Y_{p,-X1}=n_{RNTI}\neq0$, $A_p$=39827 for pmod3=0, $A_p$=39829 for pmod3=1, $A_p$=39839 for pmod3=2, and D=65537, where $n_{s,f}^{\mu}$ is the index of the first slot from the X1 slots. $Y=Y_{p,n_{s,f}^{\mu}}$ is used to determine CCE indexes for each PDCCH candidate in any PDCCH monitoring occasion within the PDCCH monitoring duration of X1 slots.

Additionally, in Equation (18), i=0, . . . , L–1. The expression, $N_{CCE,p}$, is the number of CCEs, numbered from 0 to $N_{CCE,p}$–1, in CORESET p and, if any, per RB set. The expression, $n_{CI}$, is the carrier indicator field value if the UE is configured with a carrier indicator field by CrossCarrier-SchedulingConfig for the serving cell on which PDCCH is monitored; otherwise, including for any CSS, $n_{CI}$=0. The expression, can equal 0, . . . , $M_{s,n_{CI}}^{(L)}$–1, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)}=M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In a second method of multi-slot based PDCCH monitoring capability, the UE determines a span configured with a number of PDCCH candidates. The span consists of up to Y2 consecutive symbols or slots. A time separation between the start of any two consecutive spans configured with PDCCH candidates is no smaller than X2 slots, where X2>1.

For a search space set, s, associated with CORESET, p, the UE determines a number of PDCCH candidates in a span. Each of the PDCCH candidates consists of a number of CCEs. The CCE indexes for aggregation level L corresponding to PDCCH candidate $m_{s,n_{CI}}$ of the search space set for the active DL BWP of the serving cell corresponding to carrier indicator field value $n_{CI}$ is described in Equation (19), below.

$$L\cdot\left\{\left(Y+\left\lfloor\frac{m_{s,n_{CI}}\cdot N_{CCE,p}}{L\cdot M_{s,max}^{(L)}}\right\rfloor+n_{CI}\right)\bmod\left\lfloor N_{CCE,p}/L\right\rfloor\right\}+i \qquad (19)$$

It is noted that Equation (19) can be used for any CSS where Z=0. For example, for any USS, one of the following method can be used. In one method, $Y=Y_{p,X2\cdot n_{s,f}^{\mu}}=(A_p\cdot Y_{p,X2\cdot(n_{s,f}^{\mu}-1)})$modD, $Y_{p,-X2}=n_{RNTI}\neq0$, $A_p$=39827 for pmod3=0, $A_p$=39829 for pmod3=1, $A_p$=39839 for pmod3=2, and D=65537, where $n_{s,f}^{\mu}$ is the index of the first slot of the span. $Y=Y_{p,X2\cdot n_{s,f}^{\mu}}$ is used to determine CCE indexes for each PDCCH candidate in the span. In another method, $Y=Y_{p,n_{s,f}^{\mu}}=(A_p\cdot Y_{p,n_{s,f}^{\mu}-X2})$modD, $Y_{p,-X2}=n_{RNTI}\neq A_p$=39827 for pmod3=0, $A_p$=39829 for pmod3=1, $A_p$=39839 for pmod3=2, and D=65537, where nit is the index of the first slot of the span. $Y=Y_{p,n_{s,f}^{\mu}}$ is used to determine CCE indexes for each PDCCH candidate in the span.

Additionally, in Equation (19), i=0, . . . , L–1. The expression, $N_{CCE,p}$ is the number of CCEs, numbered from 0 to $N_{CCE,p}$–1, in CORESET p and, if any, per RB set. The expression, $n_{CI}$ is the carrier indicator field value if the UE is configured with a carrier indicator field by CrossCarrier-SchedulingConfig for the serving cell on which PDCCH is monitored; otherwise, including for any CSS, $n_{CI}$=0. The expression, $M_{s,n_{CI}}$, can equal 0, . . . , $M_{s,n_{CI}}^{(L)}$–1, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)}=M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In a third method of multi-slot based PDCCH monitoring capability according to a combination of $(X_s, Y_s)$, where $X_s$ and $Y_s$ are numbers of consecutive slots, groups of $X_s$ slots are consecutive and non-overlapping, and the $Y_s$ slots are within the $X_s$ slots. The first group of $X_s$ slots starts from the beginning of a subframe. The start of two consecutive groups of $Y_s$ slots is separated by $X_s$ slots. The UE determines a span configured with a number of PDCCH candidates according to the combination of $(X_s, Y_s)$.

In a first approach for determining CCE allocation for a search space set s associated with CORESET p, the CCE indexes for aggregation level L corresponding to PDCCH candidate $m_{s,n_{CI}}^{(L)}$ of the search space set in slot $n_{s,f}^{\mu}$ for an active DL BWP of a serving cell corresponding to carrier indicator field value $n_{CI}$ is described in Equation (20), below.

$$L\cdot\left\{\left(\left\lfloor\frac{Y_{p,(SFN\bmod K)\cdot N_{slot}^{frame,\mu}+n_{s,f}^{\mu}}^{+}+m_{s,n_{CI}}^{(L)}\cdot N_{CCE,p}}{L\cdot M_{s,max}^{(L)}}\right\rfloor+n_{CI}\right)\bmod\left\lfloor N_{CCE,p}/L\right\rfloor\right\}+i \qquad (20)$$

Here, K=1 for PDCCH monitoring per slot or per span; and K=$X_s$ for PDCCH monitoring per group of $X_s$ slots according to combination $(X_s, Y_s)$. It is noted that for any CSS, $Y_{p,(SFN\bmod K)\cdot N_{slot}^{frame,\mu}+n_{s,f}^{\mu}}$=0. Additionally, for a USS, $Y_{p,(SFN\bmod K)\cdot N_{slot}^{frame,\mu}+n_{s,f}^{\mu}}=(A_p\cdot Y_{p,(SFN\bmod K)\cdot N_{slot}^{frame,\mu}+n_{s,f}^{\mu}-1})$ modD, $Y_{p,-1}=n_{RNTI}\neq0$, $A_p$=39827 for pmod3=0, $A_p$=39829 for pmod3=1, $A_p$=39839 for pmod3=2, and D=65537. Additionally, in Equation (20), i=0, . . . , L–1. The expression, $N_{CCE,p}$, is the number of CCEs, numbered from 0 to $N_{CCE,p}$–1, in CORESET p and, if any, per RB set. The expression, $n_{CI}$ is the carrier indicator field value if the UE is configured with a carrier indicator field by CrossCarrier-SchedulingConfig for the serving cell on which PDCCH is monitored; otherwise, including for any CSS, $n_{CI}$=0. The expression, $m_{s,n_{CI}}$, can equal 0, . . . , $M_{s,n_{CI}}^{(L)}$–1, where $M_{s,n_{CI}}^{(L)}$ is the number of PDCCH candidates the UE is configured to monitor for aggregation level L of a search space set s for a serving cell corresponding to $n_{CI}$. It is noted that for any CSS $M_{s,max}^{(L)}=M_{s,0}^{(L)}$. Additionally, for a USS, $M_{s,max}^{(L)}$ is the maximum of $M_{s,n_{CI}}^{(L)}$, over all configured $n_{CI}$ values for a CCE aggregation level L of search space set s. Additionally, the RNTI value used for $n_{RNTI}$ is the C-RNTI.

In a second approach for determining CCE allocation for a search space set s associated with CORESET p, the CCE indexes for aggregation level L corresponding to PDCCH candidate $m_{s,n_{CI}}^{(L)}$ of the search space set in slot $n_{s,f}^{\mu}$ for an active DL BWP of a serving cell corresponding to carrier indicator field value $n_{CI}$ described in Equation (21), below.

$$L\cdot\left\{\left(\left\lfloor\frac{Y_{p,(SFN\bmod K)\cdot N_{slot}^{frame,\mu}+\lfloor n_{s,f}^{\mu}/K\rfloor}^{+}+m_{s,n_{CI}}^{(L)}\cdot N_{CCE,p}}{L\cdot M_{s,max}^{(L)}}\right\rfloor+n_{CI}\right)\bmod\left\lfloor N_{CCE,p}/L\right\rfloor\right\}+i \qquad (21)$$

Here, K=1 for PDCCH monitoring per slot or per span; and K=$X_s$ for PDCCH monitoring per group of $X_s$ slots according to combination $(X_s, Y_s)$. It is noted that for any CSS, $Y_{p,(SFN \ mod \ K) \cdot N_{slot}^{frame,\mu} + \lfloor n_{s,f}^{\mu}/K \rfloor} = 0$. Additionally, for a USS, $Y_{p,(SFN \ mod \ K) \cdot N_{slot}^{frame,\mu} + \lfloor n_{s,f}^{\mu}/K \rfloor} = (A_p \cdot Y_{p,(SFN \ mod \ K) \cdot N^{slotframe,\mu} + \lfloor n_{s,f}^{\mu}-1)/K \rfloor}) mod D$, $Y_{p,-1} = n_{RNTI} \neq 0$, $A_p = 39827$ for pmod3=0, $A_p = 39829$ for pmod3=1, $A_p = 39839$ for pmod3=2, and D=65537. Additionally, in Equation (21), i=0, . . . , L−1. The expression, $N_{CCE,p}$, is the number of CCEs, numbered from 0 to $N_{CCE,p}$−1, in CORESET p and, if any, per RB set. The expression, $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. The expression, $m_{s,n_{CI}}$, can equal 0, . . . , $M_{s,n_{CI}}^{(L)}$−1, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)} = M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In a third approach for a search space set s associated with CORESET p, the CCE) indexes for aggregation level L corresponding to PDCCH candidate $m_{s,n_{CI}}^{(L)}$ of the search space set in slot $n_{s,f}^{\mu}$ for an active DL BWP of a serving cell corresponding to carrier indicator field value $n_{CI}$ is described in Equation (22), below.

$$L \cdot \left\{ \left( Y_{p,\lfloor n_{s,f}^{\mu}/K \rfloor} + \left\lfloor \frac{m_{s,n_{CI}}^{(L)} \cdot N_{CCE,p}}{L \cdot M_{s,max}^{(L)}} \right\rfloor + n_{CI} \right) \mod \lfloor N_{CCE,p}/L \rfloor \right\} + i \quad (22)$$

Here, K=1 for PDCCH monitoring per slot or per span; and K=$X_s$ for PDCCH monitoring per group of $X_s$ slots according to combination $(X_s, Y_s)$. It is noted that for any CSS, $Y_{p,\lfloor n_{s,f}^{\mu}/K \rfloor} = 0$. Additionally, for a USS, $Y_{p,\lfloor n_{s,f}^{\mu}/K \rfloor} = (A_p \cdot Y_{p,\lfloor (n_{s,f}^{\mu}-1)/K \rfloor}) mod D$, $Y_{p,-1} = n_{RNTI} \neq 0$, $A_p = 39827$ for pmod3=0, $A_p = 39829$ for pmod3=1, $A_p = 39839$ for pmod3=2, and D=65537. Additionally, in Equation (22), i=0, . . . , L−1. The expression, $N_{CCE,p}$, is the number of CCEs, numbered from 0 to $N_{CCE,p}$−1, in CORESET p and, if any, per RB set. The expression, $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. The expression, $m_{s,n_{CI}}$, can equal 0, . . . , $M_{s,n_{CI}}^{(L)}$−1, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)} = M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In a fourth approach for a search space set s associated with CORESET p, the) CCE indexes for aggregation level L corresponding to PDCCH candidate $m_{s,n_{CI}}^{(L)}$ of the search space set in slot $n_{s,f}^{\mu}$ for an active DL BWP of a serving cell corresponding to carrier indicator field value $n_{CI}$ is described in Equation (23), below.

$$L \cdot \left\{ \left( Y_{p,(SFN \ mod \ K) \cdot N_{slot}^{frame,\mu} + n_{s,f}^{\mu}} + \left\lfloor \frac{m_{s,n_{CI}}^{(L)} \cdot N_{CCE,p}}{L \cdot M_{s,max}^{(L)}} \right\rfloor + n_{CI} \right) \mod \lfloor N_{CCE,p}/L \rfloor \right\} + i \quad (23)$$

Here, K=1 for PDCCH monitoring per slot or per span; and K=$X_s$ for PDCCH monitoring per group of $X_s$ slots according to combination $(X_s, Y_s)$. It is noted that for any CSS, $Y_{p,(SFN \ mod \ K) \cdot N_{slot}^{frame,\mu} + n_{s,f}^{\mu}} = 0$. Additionally, for a USS, $Y_{p,(SFN \ mod \ K) \cdot N_{slot}^{frame,\mu} + s,f}^{\mu} = (A_p \cdot Y_{p,(SFN \ mod \ K) \cdot N_{slot}^{frame,\mu} + n_{s,f}^{\mu}-1})$ modD, $Y_{p,-1} = n_{RNTI} \neq 0$, $A_p = 39827$ for pmod3=0, $A_p = 39829$ for pmod3=1, $A_p = 39839$ for pmod3=2, and D=65537. Additionally, in Equation (23), i=0, . . . , L−1. The expression, $N_{CCE,p}$, is the number of CCEs, numbered from 0 to $N_{CCE,p}$−1, in CORESET p and, if any, per RB set. The expression, $n_{CI}$ is the carrier indicator field value if the UE is configured with a carrier indicator field by CrossCarrier-SchedulingConfig for the serving cell on which PDCCH is monitored; otherwise, including for any CSS, $n_{CI}=0$. The expression, $m_{s,n_{CI}}$, can equal 0, . . . , $M_{s,n_{CI}}^{(L)}$−1, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)} = M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In a fifth approach for a search space set s associated with CORESET p, the CCE) indexes for aggregation level L corresponding to PDCCH candidate $m_{s,n_{CI}}^{(L)}$, of the search space set in slot $n_{s,f}^{\mu}$ for an active DL BWP of a serving cell corresponding to carrier indicator field value $n_{CI}$ is described in Equation (24), below.

$$L \cdot \left\{ \left( \left[ Y_{p,(SFN \ mod \ K_1) \cdot N_{slot}^{frame,\mu} + \lfloor n_{s,f}^{\mu}/K_2 \rfloor} \right]^+ + \left\lfloor \frac{m_{s,n_{CI}}^{(L)} \cdot N_{CCE,p}}{L \cdot M_{s,max}^{(L)}} \right\rfloor + n_{CI} \right) \mod \lfloor N_{CCE,p}/L \rfloor \right\} + i \quad (24)$$

Here, K=1 for PDCCH monitoring per slot or per span; and K=$X_s$ for PDCCH monitoring per group of $X_s$ slots according to combination $(X_s, Y_s)$. It is noted that for any CSS, $Y_{p,(SFN \ mod \ K_1) \cdot N_{slot}^{frame,\mu} + \lfloor n_{s,f}^{\mu}/K_2 \rfloor} = 0$. Additionally, for a USS, $Y_{p,(SFN \ mod \ K_1) \cdot N_{slot}^{frame,\mu} + \lfloor n_{s,f}^{\mu}/K_2 \rfloor} = (A_p \cdot Y_{p,(SFN \ mod \ K_1) \cdot N_{slot}^{frame,\mu} + \lfloor (n_{s,f}^{\mu}-1)/K_2 \rfloor}) modD$, $Y_{p,-1} = n_{RNTI} \neq 0$, $A_p = 39827$ for pmod3=0, $A_p = 39829$ for pmod3=1, $A_p = 39839$ for pmod3=2, and D=65537. Additionally, in Equation (24), i=0, . . . , L−1. The expression, $N_{CCE,p}$, is the number of CCEs, numbered from 0 to $N_{CCE,p}$−1, in CORESET p and, if any, per RB set. The expression, $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. The expression, $m_{s,n_{CI}}$, can equal 0, . . . , $M_{s,n_{CI}}^{(L)}$−1, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)} = M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a processor configured to identify a first subcarrier spacing (SCS) configuration; and
a transceiver, operably coupled to the processor, the transceiver configured to perform physical downlink control channel (PDCCH) monitoring according to a combination (X, Y) for the first SCS configuration, wherein:
    X and Y are numbers of consecutive slots,
    Y consecutive slots are in a group of X consecutive slots,
    the group of X consecutive slots is determined from a set of groups of X consecutive slots,
    the set of groups of X consecutive slots are consecutive and not overlapping,
    a first group of X consecutive slots within the set of groups of X consecutive slots starts from a beginning of a subframe, and
    first slots of two consecutive groups of Y slots are separated by X slots,
wherein the transceiver is further configured to transmit information on a carrier aggregation capability larger than a predefined number of downlink (DL) cells,
wherein the information on the carrier aggregation capability includes an indication for a maximum number of PDCCH candidates and a maximum number of non-overlapped control channel elements (CCEs) that the UE is available to monitor per group of X slots when the UE is configured for carrier aggregation operation over more than the predefined number of DL cells with a configuration of PDCCH multi-slot monitoring capability associated with the PDCCH monitoring, and
wherein, for the PDCCH monitoring, PDCCH candidates are allocated to UE-specific search space (USS) sets for a primary cell having an active DL bandwidth part (BWP) with the first SCS configuration in a group of X slots based on (i) the maximum number of PDCCH candidates for the group of X slots, (ii) a total number of PDCCH candidates for the group of X slots, (iii) the maximum number of non-overlapped CCEs for the group of X slots, and (iv) a total number of non-overlapped CCEs for the group of X slots.

2. The UE of claim 1, wherein the transceiver is further configured to receive second PDCCHs with a second SCS configuration within a slot on a cell and wherein the first SCS configuration>the second configuration SCS.

3. The UE of claim 1, wherein:
the first SCS configuration is 5 or 6, and
the PDCCH monitoring is performed in a slot of the Y slots per group of X slots.

4. The UE of claim 1, wherein:
the transceiver is further configured to receive information for a first number of search space sets associated with PDCCH receptions on the primary cell,
the processor is further configured to determine:
    that a number of the PDCCH receptions within the X slots, according to the first number of search space sets, is larger than a maximum number of PDCCH receptions per group of X slots, and
    a second number of search space sets from the first number of search space sets,
receptions of first PDCCHs are according to the second number of search space sets, and
a number of the first PDCCH receptions is not larger than the maximum number of PDCCH receptions per group of X slots.

5. The UE of claim 1, wherein:
the transceiver is further configured to transmit information for a number of cells, and
the information indicates a capability to receive a predetermined maximum number of PDCCHs with the first SCS configuration according to the combination (X, Y) for scheduling on each cell from the number of cells.

6. The UE of claim 1, wherein:
the UE is configured with a first set of downlink cells and a second set of downlink cells;
for each scheduled cell from the first set, the UE does not have to monitor on a DL BWP with a SCS configuration of a scheduling cell more than:
    a minimum of (a) a maximum number of PDCCH candidates for a group of X slots and (b) a total number of PDCCH candidates for the group of X slots PDCCH candidates, or
    a minimum of (a) a maximum number of non-overlapped CCEs for the group of X slots and (b) a total number of non-overlapped CCEs for the group of X slots CCEs per group of X slots; and
for each scheduled cell from the second set, the UE does not have to monitor on the DL BWP with the SCS configuration of the scheduling cell more than:
    a minimum of (a) a maximum number of PDCCH candidates for a group of X slots multiplied by a parameter $\gamma$ and (b) a total number of PDCCH candidates for the group of X slots PDCCH candidates,
    a minimum of (a) a maximum number of non-overlapped CCEs for the group of X slots multiplied by the parameter $\gamma$ and (b) a total number of non-overlapped CCEs for the group of X slots CCEs per group of X slots,
    a minimum of (a) a maximum number of PDCCH candidates for a group of X slots and (b) a total number of PDCCH candidates for the group of X slots PDCCH candidates, or
    a minimum of (a) a maximum number of non-overlapped CCEs for the group of X slots and (b) a total number of non-overlapped CCEs for the group of X slots CCEs per group of X slots for control resource sets (CORESETs) with a same coresetPoolindex value.

7. A base station (BS) comprising:
a processor configured to identify a first subcarrier spacing (SCS) configuration; and a transceiver, operably coupled to the processor, the transceiver configured to transmit, to a user equipment (UE), a physical downlink control channel (PDCCH) according to a combination (X, Y) for the first SCS configuration, wherein:

X and Y are numbers of consecutive slots,

Y consecutive slots are in a group of X consecutive slots, the group of X consecutive slots is determined from a set of groups of X consecutive slots, the set of groups of X consecutive slots are consecutive and not overlapping, a first group of X consecutive slots within the set of groups of X consecutive slots starts from a beginning of a subframe, and first slots of two consecutive groups of Y slots are separated by X slots, wherein the transceiver is further configured to receive information on a carrier aggregation capability larger than a predefined number of downlink (DL) cells, wherein the information on the carrier aggregation capability includes an indication for a maximum number of PDCCH candidates and a maximum number of non-overlapped control channel elements (CCEs) that the UE is available to monitor per group of X slots when the UE is configured for carrier aggregation operation over more than the predefined number of DL cells with a configuration of PDCCH multi-slot monitoring capability associated with the PDCCH transmission, and wherein for the PDCCH transmission, PDCCH candidates are allocated to UE-specific search space (USS) sets for a primary cell having an active DL bandwidth part (BWP) with the first SCS configuration in a group of X slots based on (i) the maximum number of PDCCH candidates for the group of X slots, (ii) a total number of PDCCH candidates for the group of X slots, (iii) the maximum number of non-overlapped CCEs for the group of X slots, and (iv) a total number of non-overlapped CCEs for the group of X slots.

8. The BS of claim 7, wherein the transceiver is further configured to transmit second PDCCHs with a second SCS configuration within a slot on a cell and wherein the first SCS configuration>the second configuration SCS.

9. The BS of claim 7, wherein:

the first SCS configuration is 5 or 6, and the PDCCH transmission is performed in a slot of the Y slots per group of X slots.

10. The BS of claim 7, wherein:

the transceiver is further configured to receive information for a number of cells, and the information indicates a capability to receive a predetermined maximum number of PDCCHs with the first SCS configuration according to the combination (X, Y) for scheduling on each cell from the number of cells.

11. The BS of claim 7, wherein:

the UE is configured with a first set of downlink cells and a second set of downlink cells;

for each scheduled cell from the first set, the UE does not have to monitor on a DL BWP with a SCS configuration of a scheduling cell more than:

a minimum of (a) a maximum number of PDCCH candidates for a group of X slots and (b) a total number of PDCCH candidates for the group of X slots PDCCH candidates, or a minimum of (a) a maximum number of non-overlapped CCEs for the group of X slots and (b) a total number of non-overlapped CCEs for the group of X slots CCEs per group of X slots; and for each scheduled cell from the second set, the UE does not have to monitor on the DL BWP with the SCS configuration of the scheduling cell more than:

a minimum of (a) a maximum number of PDCCH candidates for a group of X slots multiplied by a parameter $\gamma$ and (b) a total number of PDCCH candidates for the group of X slots PDCCH candidates, a minimum of (a) a maximum number of non-overlapped CCEs for the group of X slots multiplied by the parameter $\gamma$ and (b) a total number of non-overlapped CCEs for the group of X slots CCEs per group of X slots, a minimum of (a) a maximum number of PDCCH candidates for a group of X slots and (b) a total number of PDCCH candidates for the group of X slots PDCCH candidates, or a minimum of (a) a maximum number of non-overlapped CCEs for the group of X slots and (b) a total number of non-overlapped CCEs for the group of X slots CCEs per group of X slots for control resource sets (CORESETs) with a same coresetPoolindex value.

12. A method performed by a user equipment (UE) comprising:

identifying a first subcarrier spacing (SCS) configuration;

performing physical downlink control channel (PDCCH) monitoring according to a combination (X, Y) for the first SCS configuration, wherein:

X and Y are numbers of consecutive slots,

Y consecutive slots are in a group of X consecutive slots, the group of X consecutive slots is determined from a set of groups of X consecutive slots, the set of groups of X consecutive slots are consecutive and not overlapping, a first group of X consecutive slots within the set of groups of X consecutive slots starts from a beginning of a subframe, and first slots of two consecutive groups of Y slots are separated by X slots; and transmitting information on a carrier aggregation capability larger than a predefined number of downlink (DL) cells, wherein the information on the carrier aggregation capability includes an indication for a maximum number of PDCCH candidates and a maximum number of non-overlapped control channel elements (CCEs) that the UE is available to monitor per group of X slots when the UE is configured for carrier aggregation operation over more than the predefined number of DL cells with a configuration of PDCCH multi-slot monitoring capability associated with the PDCCH monitoring, and wherein for the PDCCH monitoring, PDCCH candidates are allocated to UE-specific search space (USS) sets for a primary cell having an active DL bandwidth part (BWP) with the first SCS configuration in a group of X slots based on (i) the maximum number of PDCCH candidates for the group of X slots, (ii) a total number of PDCCH candidates for the group of X slots, (iii) the maximum number of non-overlapped CCEs for the group of X slots, and (iv) a total number of non-overlapped CCEs for the group of X slots.

13. The method of claim 12, further comprising receiving second PDCCHs with a second SCS configuration within a slot on a cell, wherein the first SCS configuration>the second configuration SCS.

14. The method of claim 12, wherein:

the first SCS configuration is 5 or 6, and the PDCCH monitoring is performed in a slot of the Y slots per group of X slots.

15. The method of claim 12, further comprising:

receiving information for a first number of search space sets associated with PDCCH receptions on the primary cell; and determining:

that a number of the PDCCH receptions within the X slots, according to the first number of search space sets, is larger than a maximum number of PDCCH receptions per group of X slots, and a second number of search space sets from the first number of search space sets, wherein:

receptions of first PDCCHs are according to the second number of search space sets, a number of the first PDCCH receptions is not larger than the maximum number of PDCCH receptions per group of X slots.

16. The method of claim 12, further comprising transmitting information for a number of cells, wherein the information indicates a capability to receive a predetermined maximum number of PDCCHs with the first SCS configuration according to the combination (X, Y) for scheduling on each cell from the number of cells.

17. The method of claim 12, wherein:

the UE is configured with a first set of downlink cells and a second set of downlink cells;

for each scheduled cell from the first set, the UE does not have to monitor on a DL BWP with a SCS configuration of a scheduling cell more than:

a minimum of (a) a maximum number of PDCCH candidates for a group of X slots and (b) a total number of PDCCH candidates for the group of X slots PDCCH candidates, or a minimum of (a) a maximum number of non-overlapped CCEs for the group of X slots and (b) a total number of non-overlapped CCEs for the group of X slots CCEs per group of X slots; and for each scheduled cell from the second set, the UE does not have to monitor on the DL BWP with the SCS configuration of the scheduling cell more than:

a minimum of (a) a maximum number of PDCCH candidates for a group of X slots multiplied by a parameter $\gamma$ and (b) a total number of PDCCH candidates for the group of X slots PDCCH candidates, a minimum of (a) a maximum number of non-overlapped CCEs for the group of X slots multiplied by the parameter $\gamma$ and (b) a total number of non-overlapped CCEs for the group of X slots CCEs per group of X slots, a minimum of (a) a maximum number of PDCCH candidates for a group of X slots and (b) a total number of PDCCH candidates for the group of X slots PDCCH candidates, or a minimum of (a) a maximum number of non-overlapped CCEs for the group of X slots and (b) a total number of non-overlapped CCEs for the group of X slots CCEs per group of X slots for control resource sets (CORESETs) with a same coresetPoolindex value.

* * * * *